United States Patent
Nagae et al.

(10) Patent No.: US 7,656,298 B2
(45) Date of Patent: Feb. 2, 2010

(54) TAG TAPE AND TAG LABEL TAPE WITH PRINT

(75) Inventors: Tsuyoshi Nagae, Kasugai (JP); Koshiro Yamaguchi, Kagamihara (JP); Shigeki Kato, Toyoake (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 358 days.

(21) Appl. No.: 11/649,182

(22) Filed: Jan. 3, 2007

(65) Prior Publication Data
US 2007/0169880 A1 Jul. 26, 2007

(30) Foreign Application Priority Data
Jan. 13, 2006 (JP) ............... 2006-006302

(51) Int. Cl.
*G08B 13/14* (2006.01)

(52) U.S. Cl. ................ 340/572.8; 340/572.1

(58) Field of Classification Search .......... 340/572.1, 340/572.8, 10.1
See application file for complete search history.

(56) References Cited

U.S. PATENT DOCUMENTS

| 5,982,284 | A | * | 11/1999 | Baldwin et al. | .......... 340/572.8 |
| 7,205,899 | B2 | * | 4/2007 | Surkau | .......... 340/572.8 |
| 2006/0118229 | A1 | | 6/2006 | Ohashi et al. | |
| 2006/0232424 | A1 | * | 10/2006 | Duschek | .......... 340/572.8 |

FOREIGN PATENT DOCUMENTS

JP  2004-333651  11/2004

* cited by examiner

*Primary Examiner*—Jeffery Hofsass
(74) *Attorney, Agent, or Firm*—Day Pitney LLP

(57) ABSTRACT

A base tape includes: a plurality of RFID circuit elements each including an IC circuit part for storing information and a loop antenna connected to the IC circuit part; and an adhesive layer, a base film, an adhesive layer, an adhesive layer, and a separation sheet that are arranged so as to sandwich each of the RFID circuit elements from both sides in the thickness direction. The base tape is formed such that the ratio c of the sum of the thickness dimensions of the adhesive layer, base film, adhesive layer, adhesive layer, and separation sheet to the thickness dimension of the RFID circuit element is $0.8 \leq c \leq 9.8$.

5 Claims, 24 Drawing Sheets

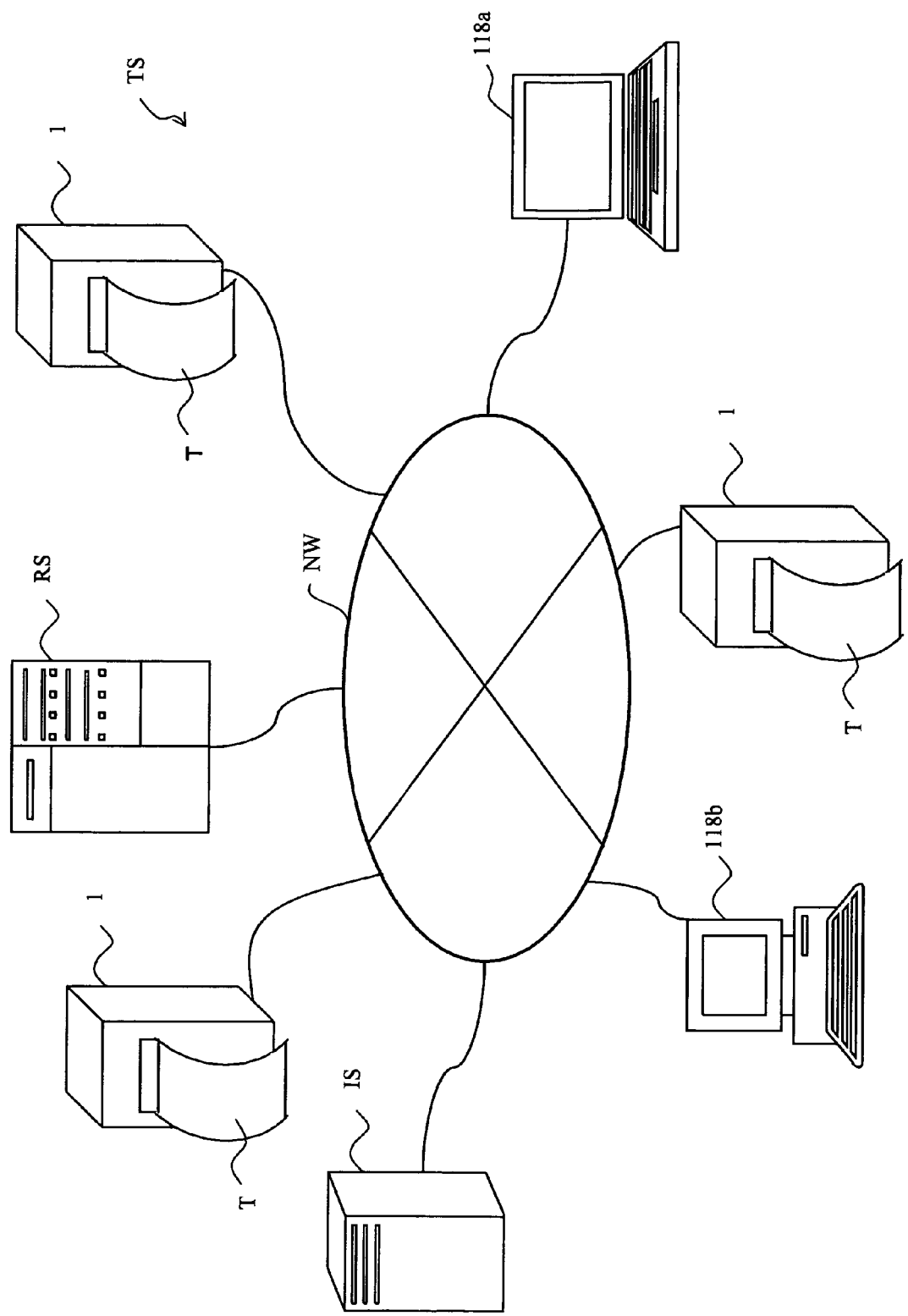

[FIG.2]
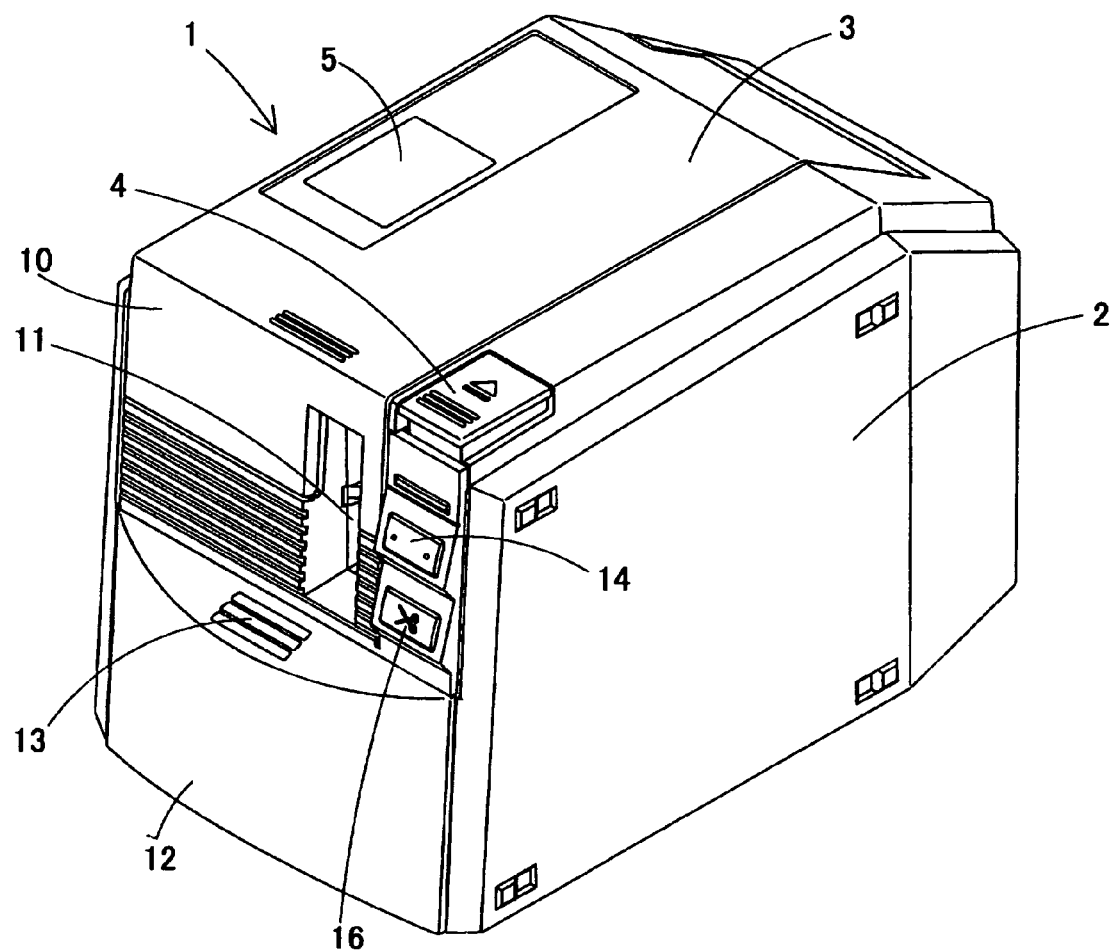

[FIG.3]
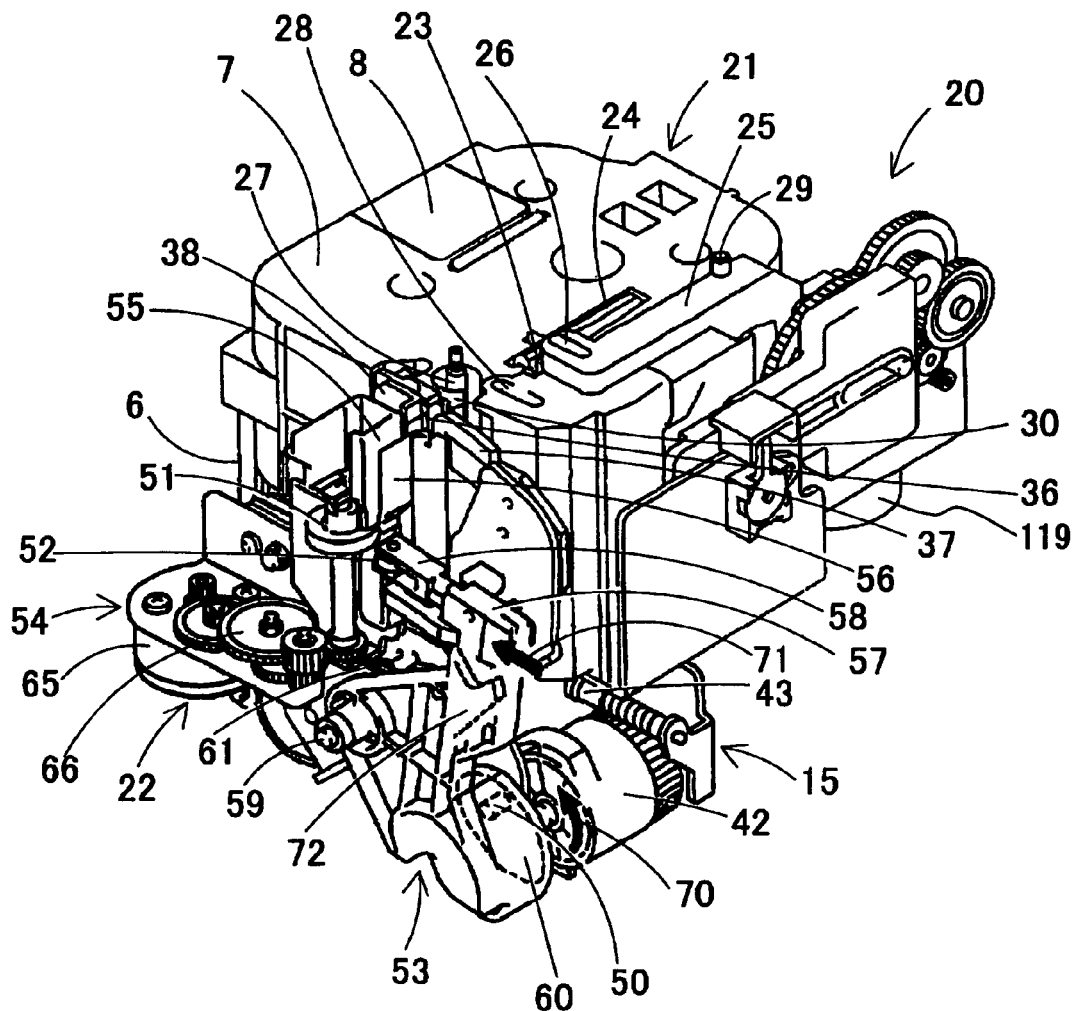

[FIG.4]
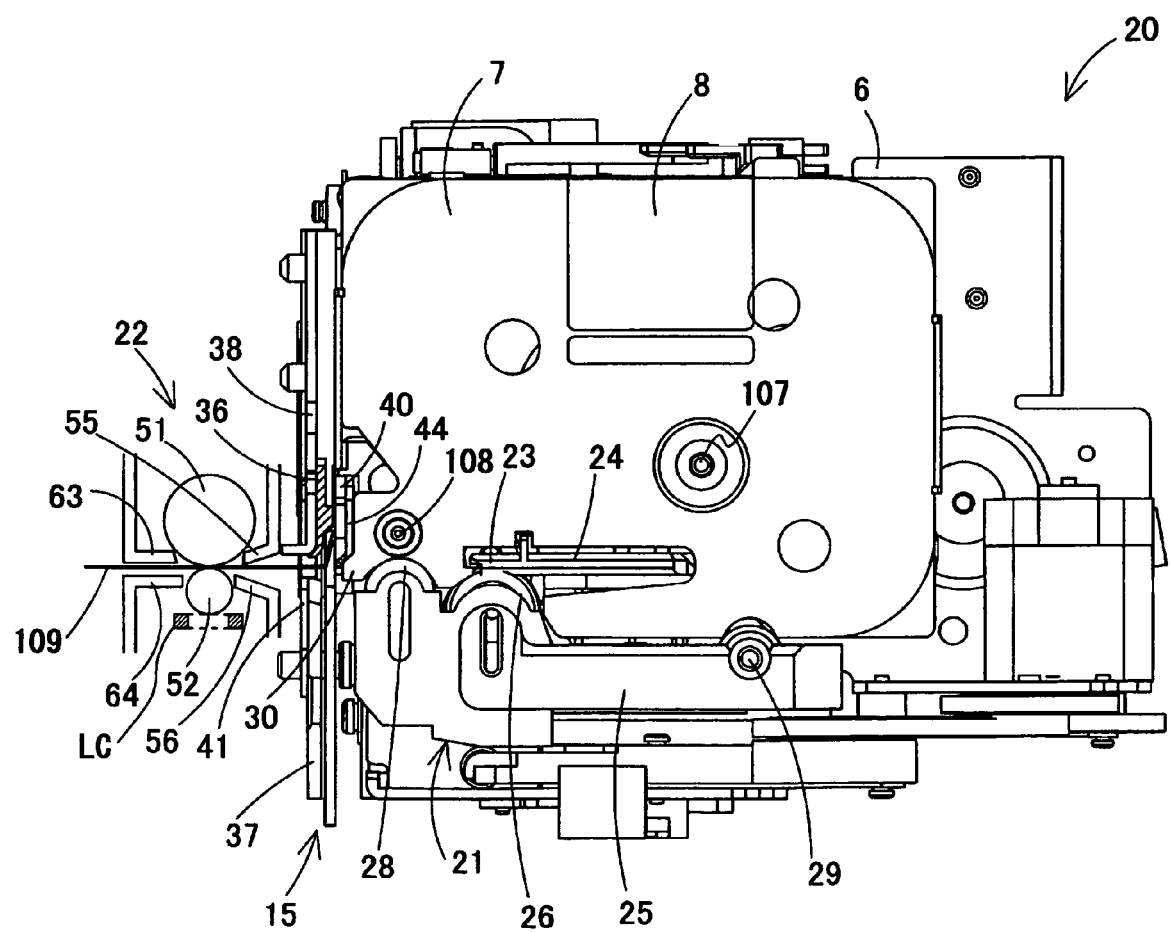

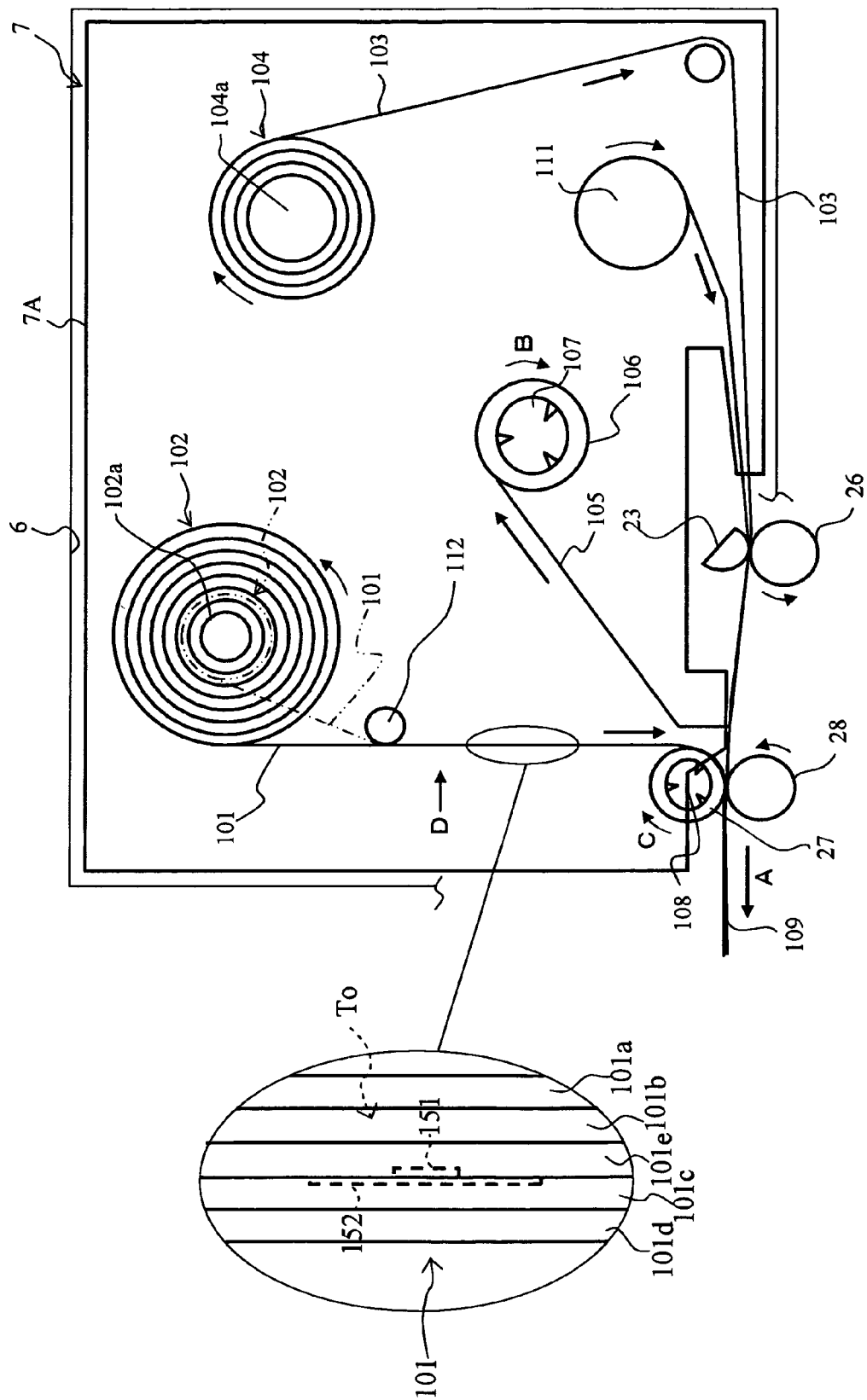
[FIG.5]

[FIG.6]
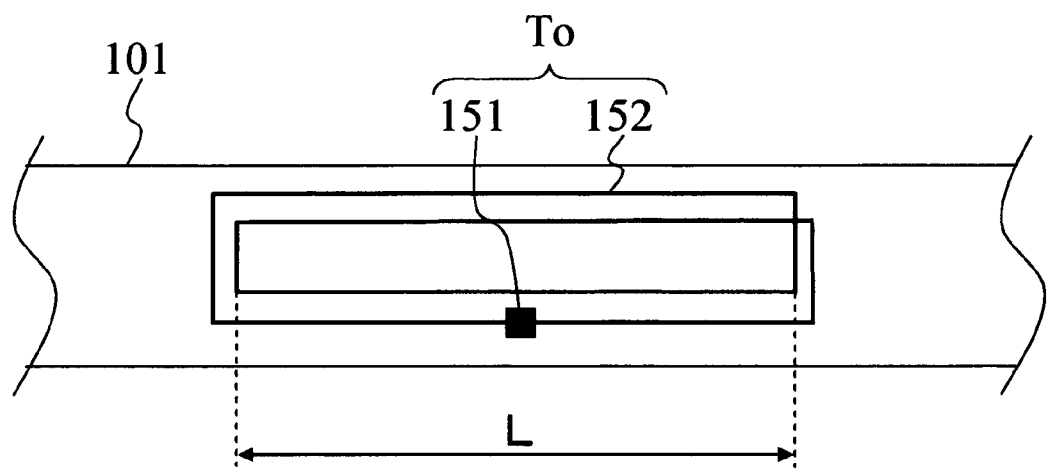

[FIG. 7]
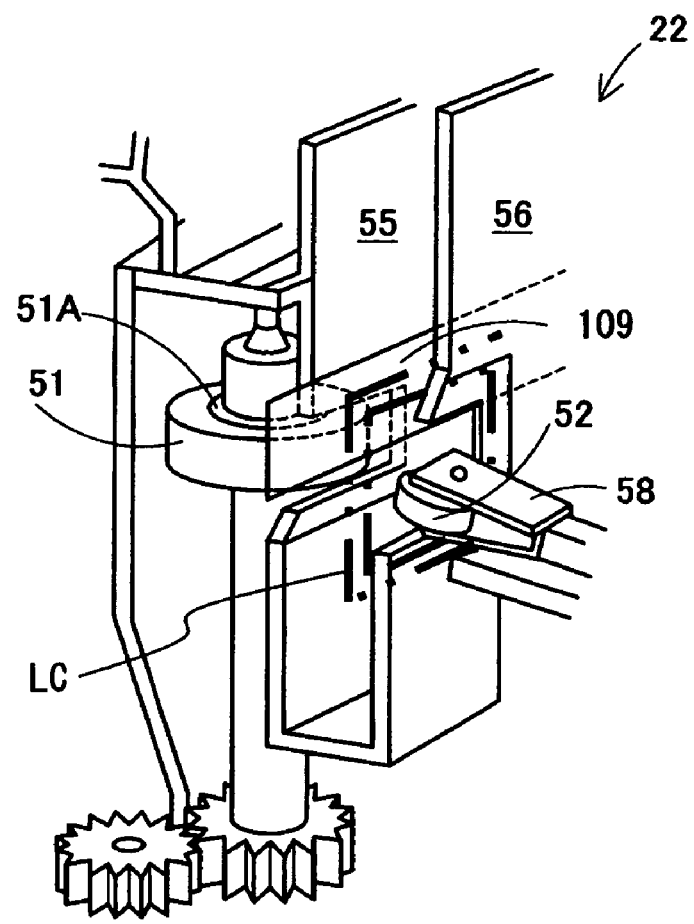

[FIG.8]
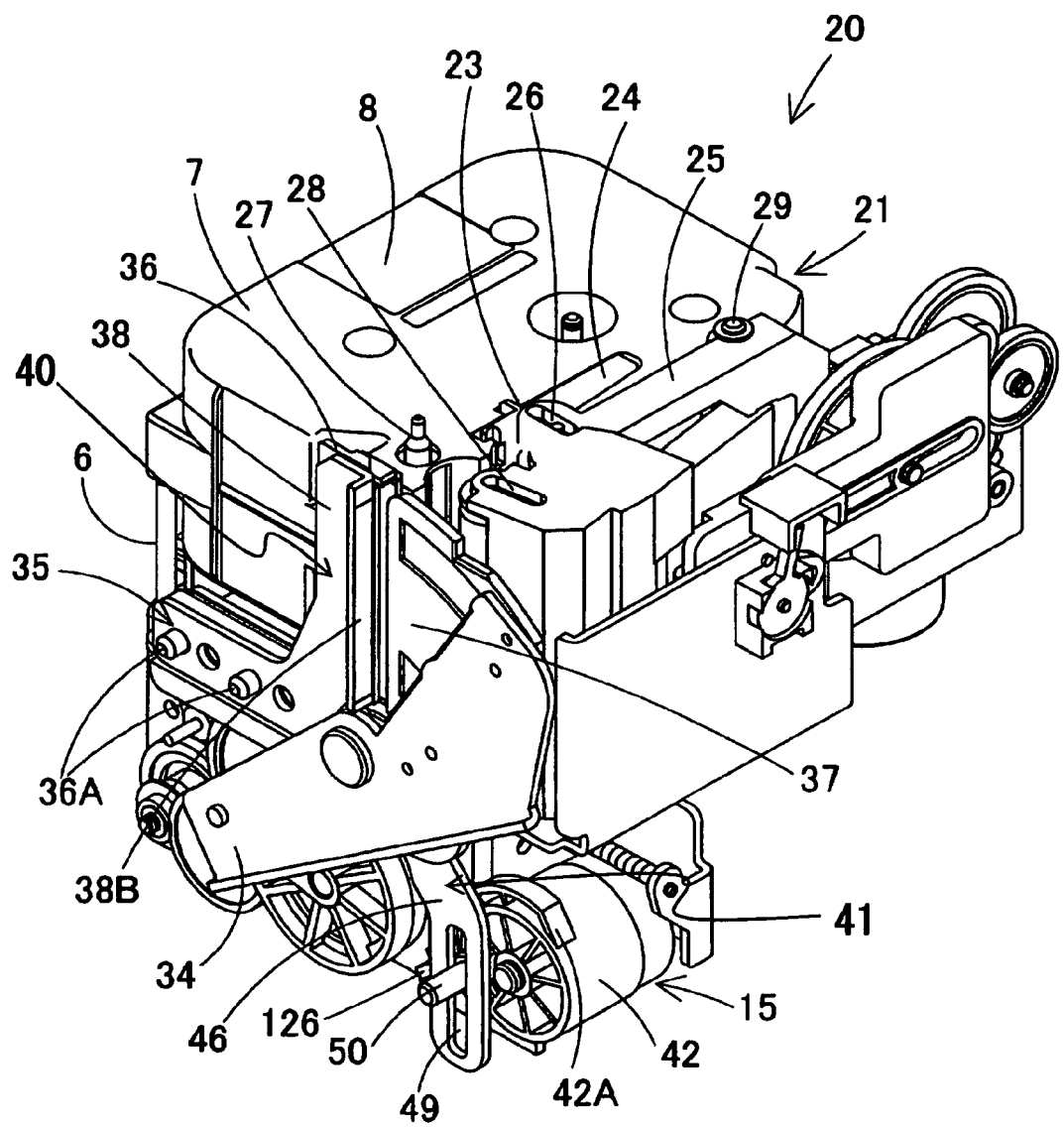

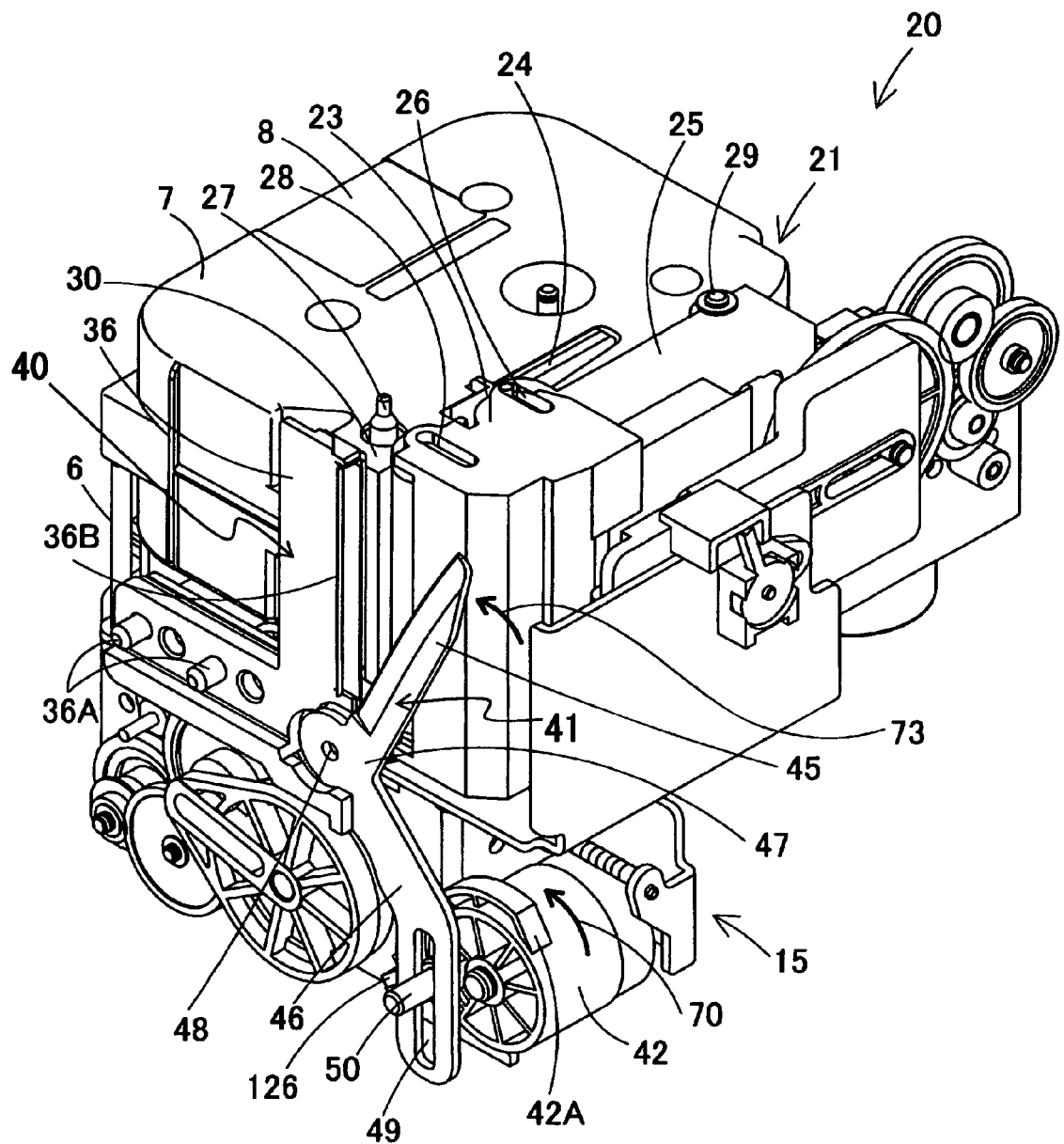
[FIG.9]

[FIG.10]
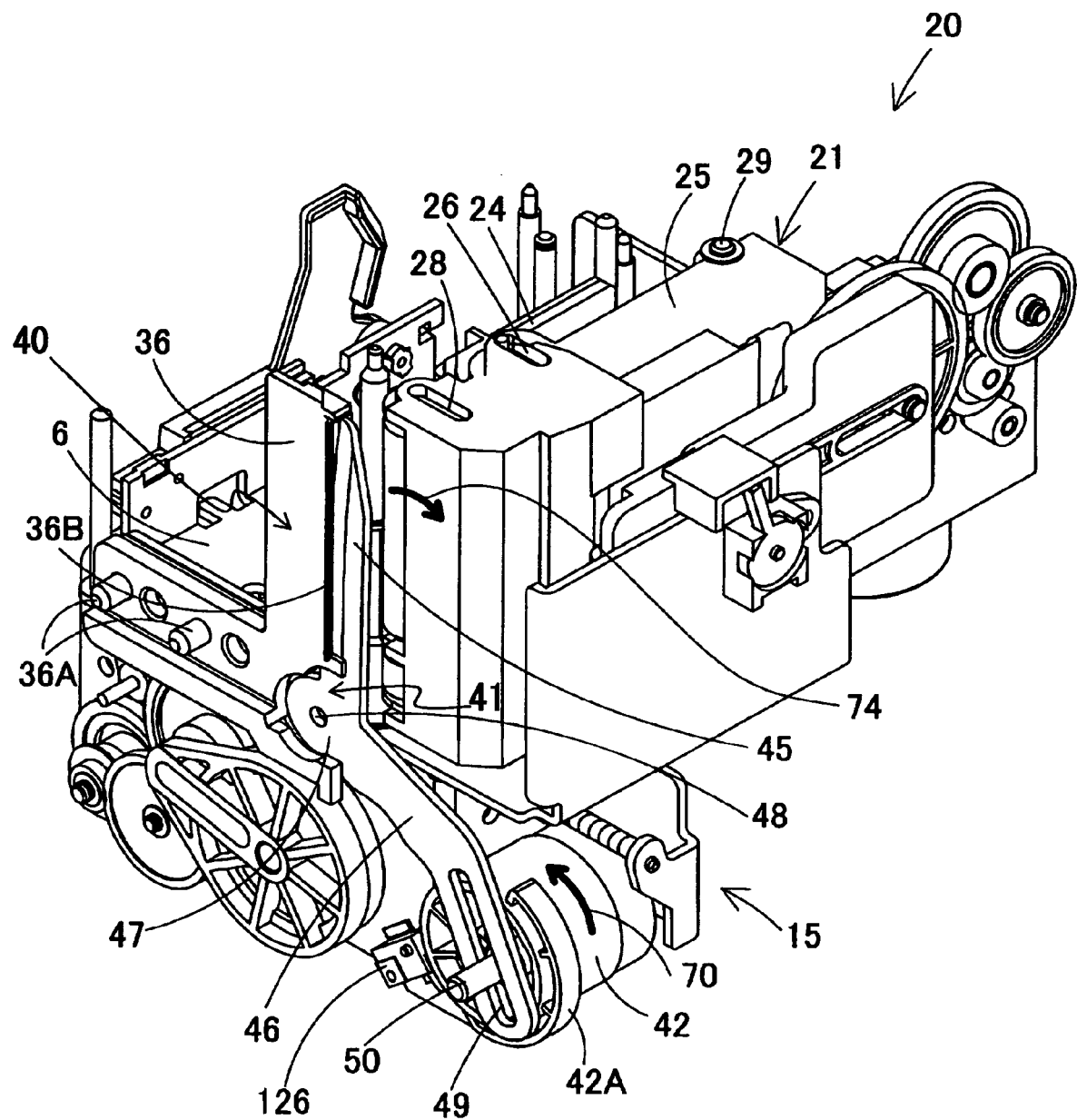

[FIG. 11]
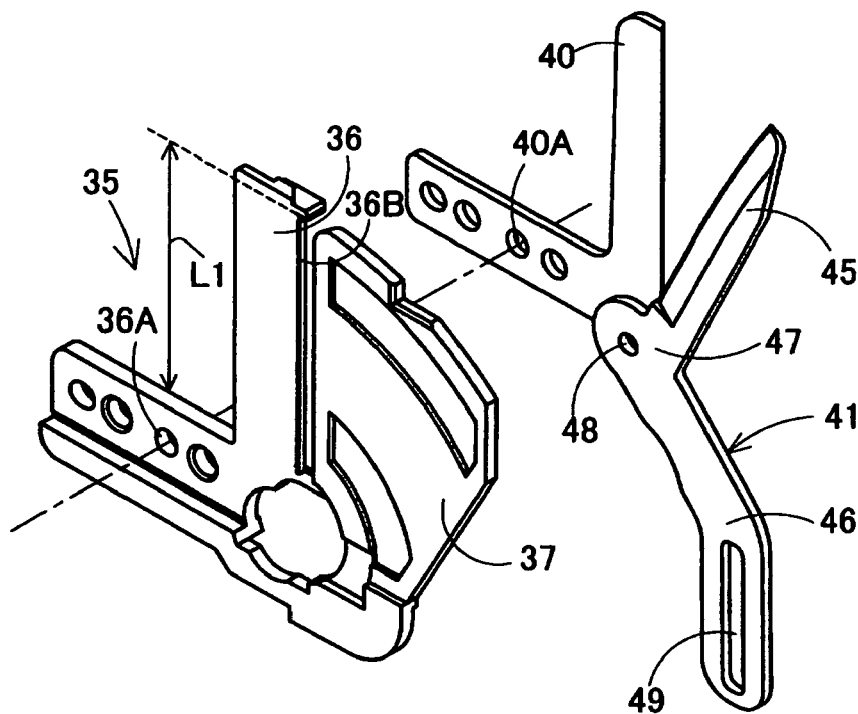
[FIG. 12]
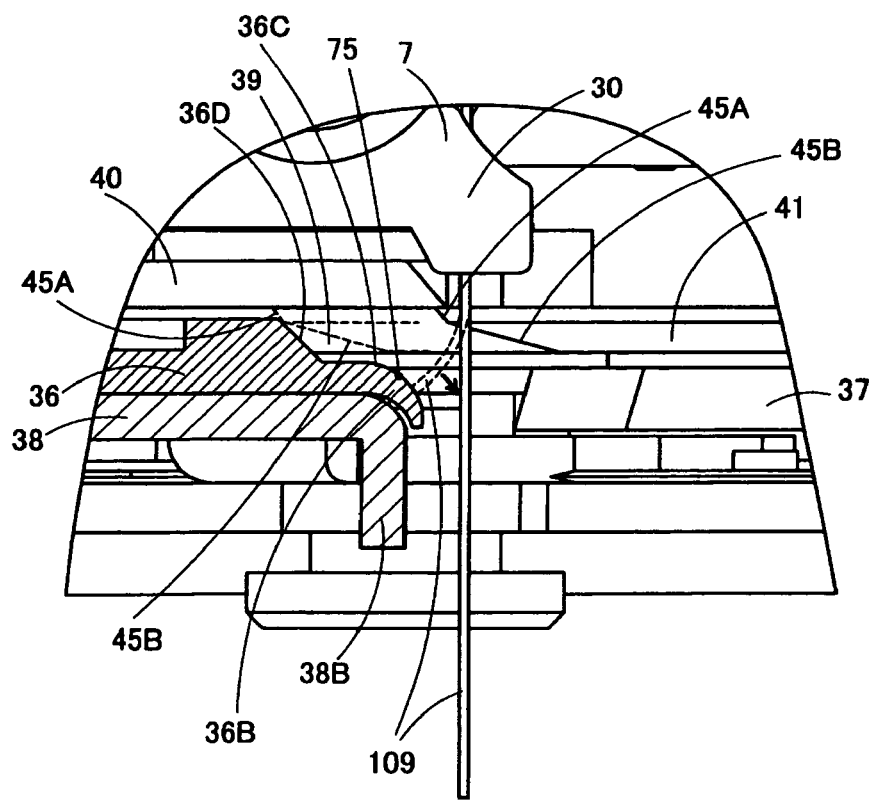

[FIG.13]
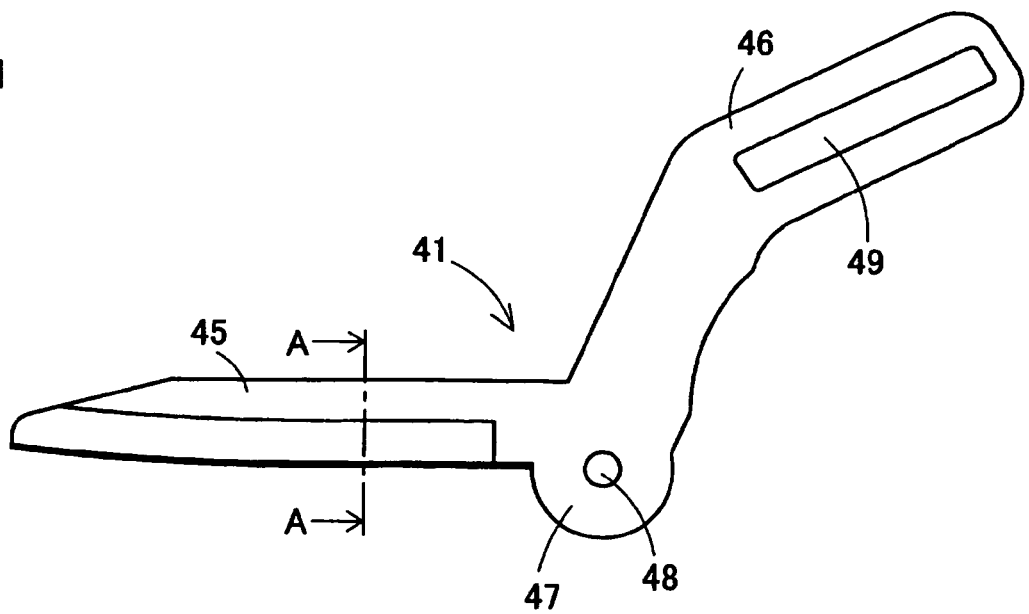
[FIG.14]
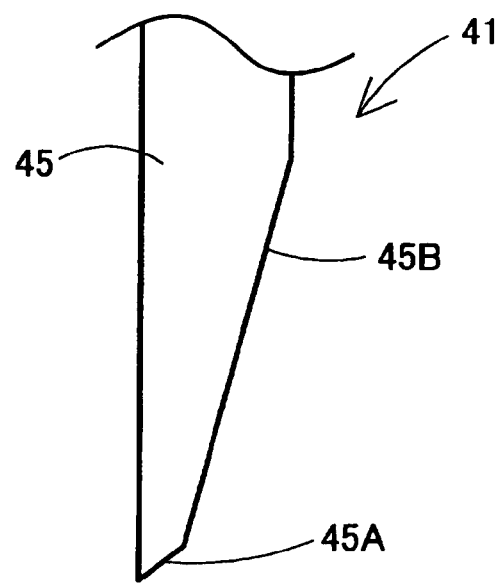

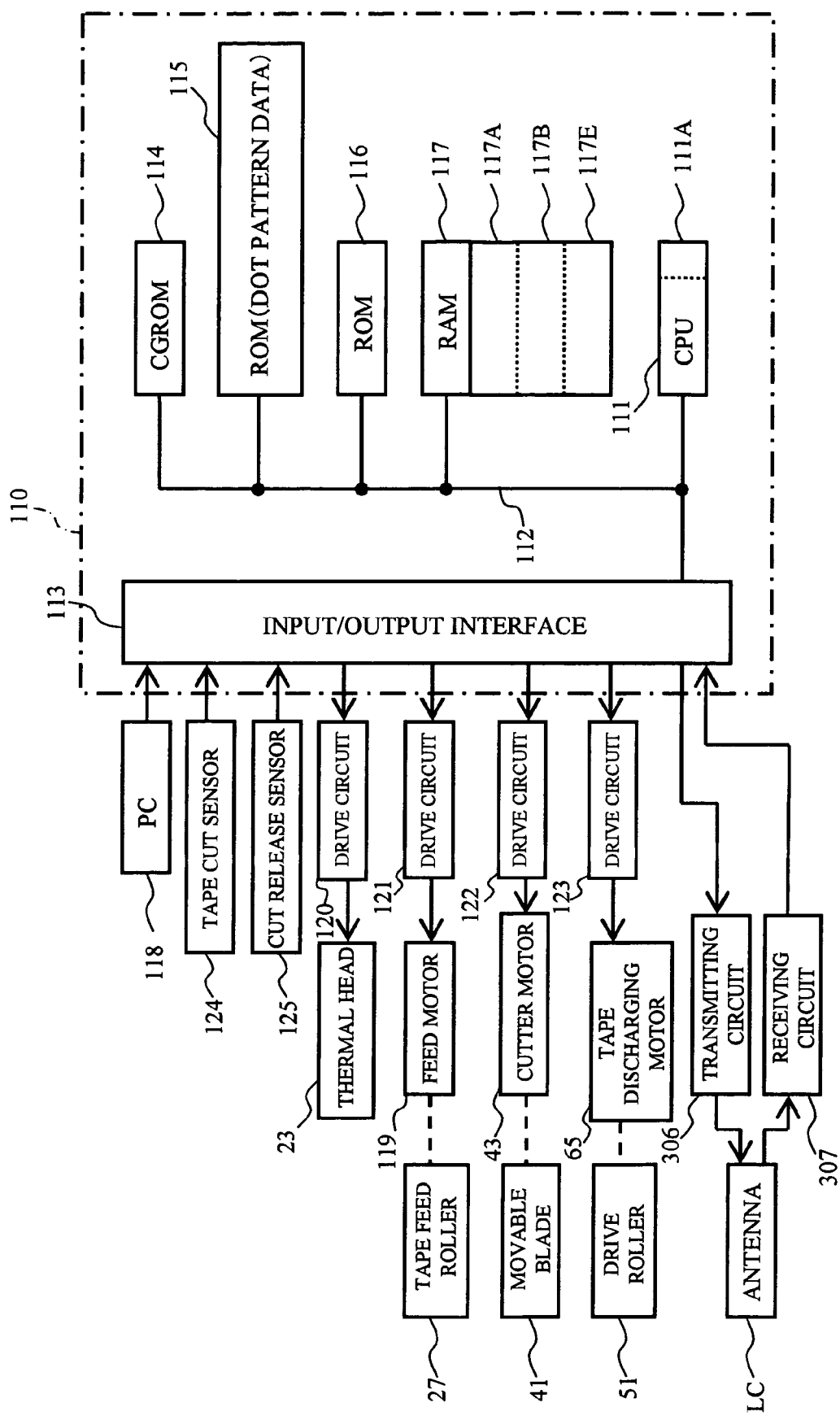
[FIG.15]

[FIG.16]
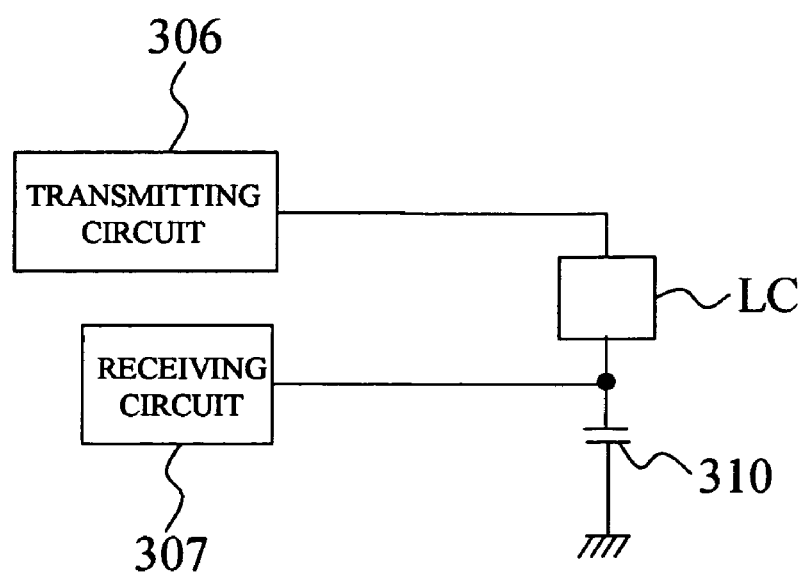

[FIG.17]
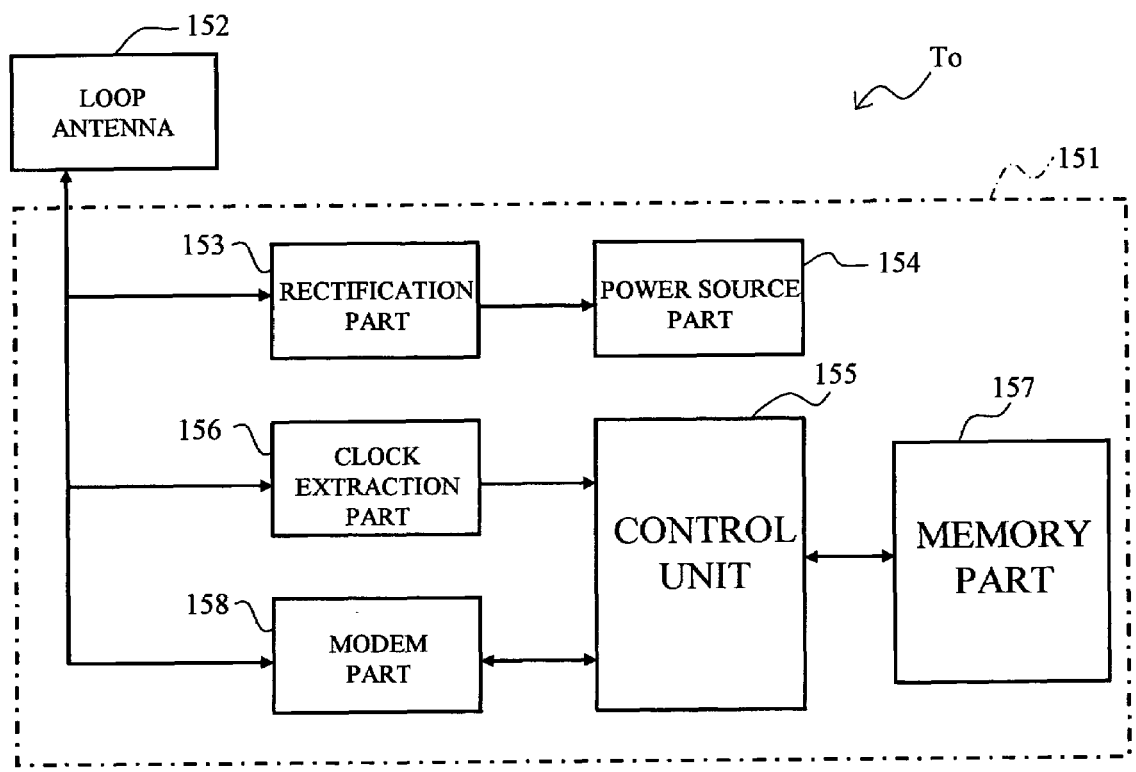

[FIG.18A]
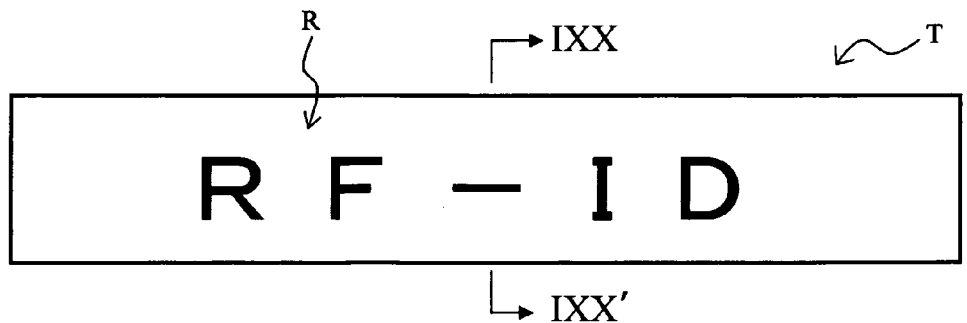
[FIG.18B]
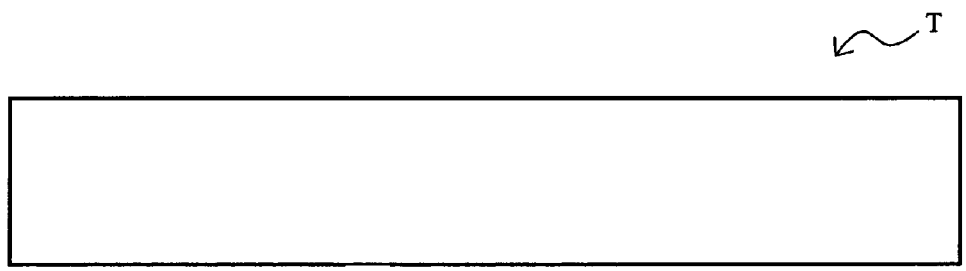
[FIG.19]
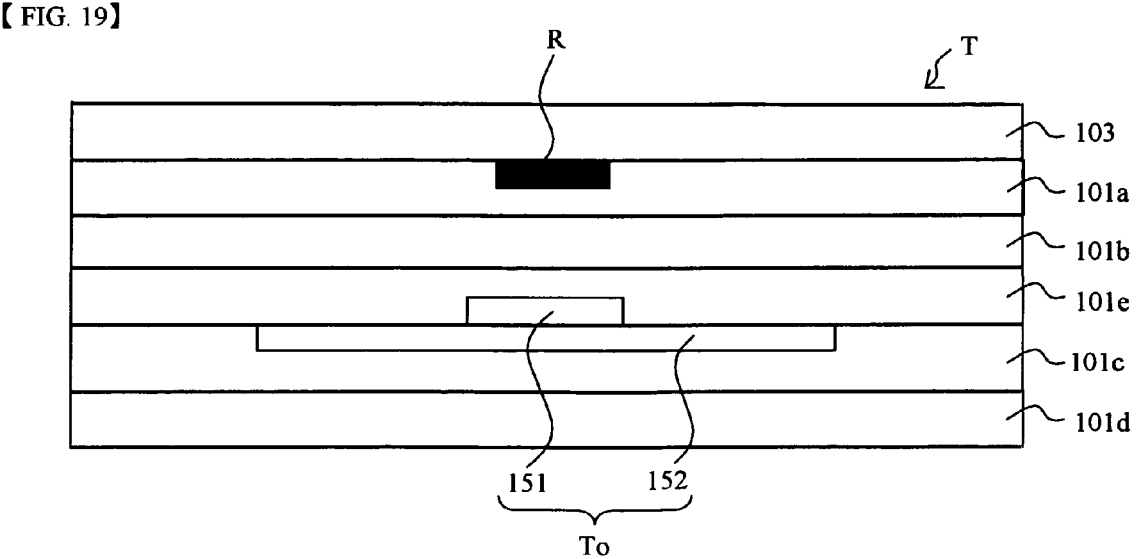

[FIG.20]

| TAG LABEL KIND |
|---|
| 13.56MHz, 100mm × 36mm TAG |

| PRINT LETTER |
|---|
| R F − I D |

| ACCESS ID |
|---|
| 1 6 , 7 7 7 , 2 1 5 |

| ITEM INFORMATION |
|---|
| 1 3 1 , 0 7 1 |

| SERVER INFORMATION |
|---|
| 2 , 0 9 7 , 1 5 1 |

[FIG.21](CASE 1)

(μm)

| | | MIN | MAX | |
|---|---|---|---|---|
| 103 | COVER FILM | 38 | 50 | A |
| 101a | ADHESIVE LAYER | 16 | 30 | |
| 101b | BASE FILM | 12 | 38 | |
| 101e | ADHESIVE LAYER | 16 | 30 | B |
| To TAG | | 30 | 110 | C |
| 101g | ADHESIVE LAYER | 16 | 30 | |
| 101f | BASE FILM | 12 | 38 | |
| 101c | ADHESIVE LAYER | 16 | 30 | D |
| 101d | SEPARATION SHEET | 25 | 70 | E |

109A points to the stack; 101A brackets 101a–101d.

COEFFICIENT  min   max
B+D+E = c × C    c =    1.0    8.9
A+B+D+E = c' × C   c' =  1.4   10.5  (WHEN COVER FILM IS INCLUDED)

[FIG.22] (CASE 2)

(μm)

| | | MIN | MAX | |
|---|---|---|---|---|
| 103 | COVER FILM | 38 | 50 | A |
| 101a | ADHESIVE LAYER | 16 | 28 | |
| 101b | BASE FILM | 12 | 38 | |
| 101e | ADHESIVE LAYER | 16 | 28 | B |
| To TAG | | 30 | 110 | C |
| 101g | ADHESIVE LAYER | 16 | 28 | |
| 101f | BASE FILM | 12 | 25 | |
| 101c | ADHESIVE LAYER | 16 | 28 | D |
| 101d | SEPARATION SHEET | 25 | 70 | E |

109B points to the stack; 101B brackets 101a–101d.

COEFFICIENT  min   max
B+D+E = c × C    c =    1.0    8.2
A+B+D+E = c' × C   c' =  1.4    9.8  (WHEN COVER FILM IS INCLUDED)

[FIG.23] (CASE 3)

| | | | (μm) | | |
|---|---|---|---|---|---|
| | | | MIN | MAX | |
| 103 | COVER FILM | | 38 | 50 | A |
| 101a | ADHESIVE LAYER | | 16 | 28 | |
| 101b | BASE FILM | | 12 | 38 | |
| 101e | ADHESIVE LAYER | | 16 | 28 | B |
| To | TAG | | 30 | 110 | C |
| 101c | ADHESIVE LAYER | | 16 | 28 | D |
| 101d | SEPARATION SHEET | | 25 | 70 | E |

(101D comprises 101a, 101b, 101e, 101c, 101d; 109D label points to stack)

```
                    COEFFICIENT  min   max
        B+D+E=c×C        c=     0.8   6.4
       A+B+D+E=c'×C     c'=     1.1   8.1   (WHEN COVER FILM IS INCLUDED)
```

[FIG.24](CASE 4)

| | | | (μm) | | |
|---|---|---|---|---|---|
| | | | MIN | MAX | |
| 103 | COVER FILM | | 38 | 50 | A |
| 101a | ADHESIVE LAYER | | 15 | 28 | |
| 101b | BASE FILM | | 11 | 38 | |
| 101e | ADHESIVE LAYER | | 15 | 28 | B |
| To | TAG | | 30 | 130 | C |
| 101c | ADHESIVE LAYER | | 15 | 28 | D |
| 101d | SEPARATION SHEET | | 25 | 70 | E |

```
                    COEFFICIENT  min   max
        B+D+E=c×C        c=     0.6   6.4
       A+B+D+E=c'×C     c'=     0.9   8.1   (WHEN COVER FILM IS INCLUDED)
```

[FIG.25]

|  | CASE 1<br>$1.0 \leqq c \leqq 8.9$<br>$1.4 \leqq c' \leqq 10.5$ | CASE 2<br>$1.0 \leqq c \leqq 8.2$<br>$1.4 \leqq c' \leqq 9.8$ | CASE 3<br>$0.8 \leqq c \leqq 6.4$<br>$1.1 \leqq c' \leqq 8.1$ | CASE 4<br>$0.6 \leqq c \leqq 6.4$<br>$0.9 \leqq c' \leqq 8.1$ |
|---|---|---|---|---|
| WRINKLE SUPPRESSION | × | ○ | ○ | × |
| TAPE RIGIDITY | × | ○ | ○ | ○ |

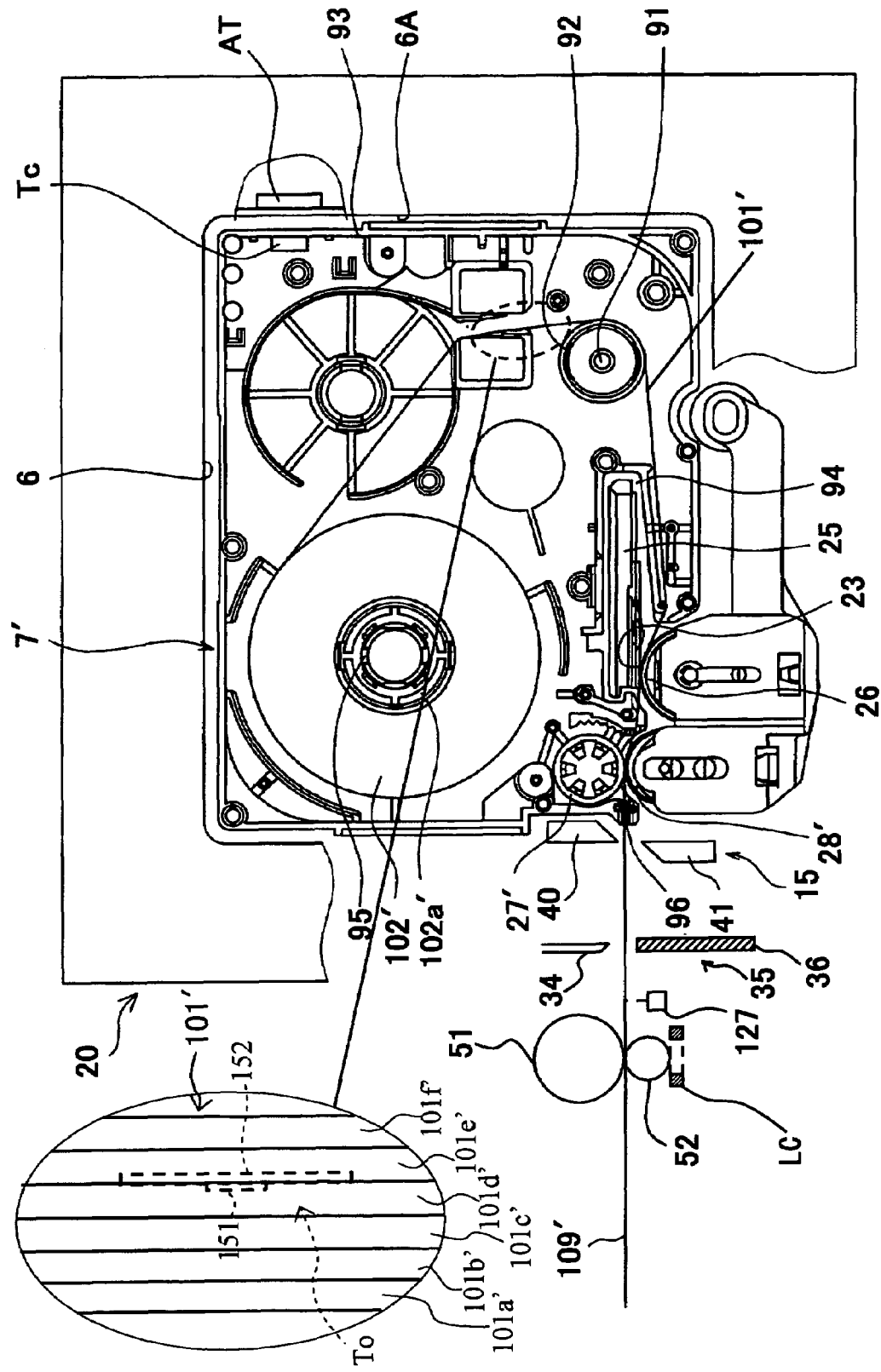
[FIG. 26]

[FIG.27](CASE 5)

| | MIN | MAX | |
|---|---|---|---|
| COVER FILM (101a') | 38 | 50 | A |
| ADHESIVE LAYER (101b') | 16 | 30 | |
| BASE FILM (101c') | 12 | 38 | |
| ADHESIVE LAYER (101d') | 16 | 30 | B |
| TAG (To) | 30 | 110 | C |
| ADHESIVE LAYER (101g') | 16 | 30 | |
| BASE FILM (101h') | 12 | 38 | |
| ADHESIVE LAYER (101e') | 16 | 30 | D |
| SEPARATION SHEET (101f') | 25 | 70 | E |

(μm), 109A', 101A'

COEFFICIENT   min   max
A+B+D+E = c2 × C    c2 =   1.4    10.5

[FIG.28](CASE 6)

| | MIN | MAX | |
|---|---|---|---|
| COVER FILM (101a') | 38 | 50 | A |
| ADHESIVE LAYER (101b') | 16 | 28 | |
| BASE FILM (101c') | 12 | 38 | |
| ADHESIVE LAYER (101d') | 16 | 28 | B |
| TAG (To) | 30 | 110 | C |
| ADHESIVE LAYER (101g') | 16 | 28 | |
| BASE FILM (101h') | 12 | 25 | |
| ADHESIVE LAYER (101e') | 16 | 28 | D |
| SEPARATION SHEET (101f') | 25 | 70 | E |

(μm), 109B', 101B'

COEFFICIENT   min   max
A+B+D+E = c2 × C    c2 =   1.4    9.8

[FIG.29](CASE 7)

| | | | (μm) | | |
|---|---|---|---|---|---|
| | | | MIN | MAX | |
| 101a' | COVER FILM | | 38 | 50 | A |
| 101b' | ADHESIVE LAYER | | 16 | 28 | |
| 101c' | BASE FILM | | 12 | 38 | |
| 101d' | ADHESIVE LAYER | | 16 | 28 | B |
| To | TAG | | 30 | 110 | C |
| 101e' | ADHESIVE LAYER | | 16 | 28 | D |
| 101f' | SEPARATION SHEET | | 25 | 70 | E |

109D' → 101D'

COEFFICIENT  min  max
A+B+D+E=c2×C  c2=  1.1  8.1

[FIG.30](CASE 8)

| | | | (μm) | | |
|---|---|---|---|---|---|
| | | | MIN | MAX | |
| 101a' | COVER FILM | | 38 | 50 | A |
| 101b' | ADHESIVE LAYER | | 15 | 28 | |
| 101c' | BASE FILM | | 11 | 38 | |
| 101d' | ADHESIVE LAYER | | 15 | 28 | B |
| To | TAG | | 30 | 130 | C |
| 101e' | ADHESIVE LAYER | | 15 | 28 | D |
| 101f' | SEPARATION SHEET | | 25 | 70 | E |

109E → 101E'

COEFFICIENT  min  max
A+B+D+E=c2×C  c2=  0.9  8.1

[FIG.31]

|  | CASE 5<br>$1.4 \leq c2 \leq 10.5$ | CASE 6<br>$1.4 \leq c2 \leq 9.8$ | CASE 7<br>$1.1 \leq c2 \leq 8.1$ | CASE 8<br>$0.9 \leq c2 \leq 8.1$ |
|---|---|---|---|---|
| WRINKLE SUPPRESSION | × | ○ | ○ | × |
| TAPE RIGIDITY | × | ○ | ○ | ○ |

TAG TAPE AND TAG LABEL TAPE WITH PRINT

CROSS-REFERENCE TO RELATED APPLICATIONS

This application claims priority from JP 2006-006302, filed Jan. 13, 2006, the contents of which are hereby incorporated by reference.

BACKGROUND OF THE INVENTION

1. Field of the Invention

The present disclosure relates to a tag tape having RFID circuit elements that store information, and a tag label tape with print having the tag tape and a print-receiving tape on which predetermined printing is performed.

2. Description of the Related Art

An RFID (Radio Frequency Identification) system is known which performs transmission/reception of information in a non-contact manner (by an electromagnetic coupling method, electromagnetic induction method, or electromagnetic radiation method or the like using a coil) with respect to an RFID circuit element that stores information.

For example, as an example of a tag-label producing device (RFID label producing device) that produces an RFID label by performing transmission/reception of information to/from such an RFID circuit element (see, for example, JP,A,2004-333651). In this related art, a tag tape (band-like tape) in which RFID circuit elements (antenna parts; IC chips) are arranged at substantially equal intervals in the longitudinal direction of the tape is wound around a feed spool. This tag tape includes, in order from the radially outer side of the feed spool, a bonding adhesive material layer (second adhesive layer) for bonding the tag tape onto the above-mentioned print-receiving tape, a tape base layer (base), an affixing adhesive material layer for affixing the produced tag label onto a target affixing object, and a separation material layer that is peeled off at the time of affixing the tag label, with the above-mentioned RFID circuit elements being provided between the tape base layer and the affixing adhesive material layer.

The tag tape constructed as described above is supplied from the feed spool, and adhered through the bonding adhesive material layer onto the print-receiving tape (laminate tape) on which desired printing has been performed, thereby forming a tag label tape with print. Then, RFID tag information is written with respect to the RFID circuit elements equipped in this tag label tape with print, and the tag label tape with print is cut into a desired length, thereby successively producing tag labels with print. To use the tag labels thus produced, the bonding adhesive material layer is exposed by peeling off the separation material layer, and the entire label is affixed onto the target affixing object with the adhesive force of the bonding adhesive material layer.

In the case where a tag label is constructed as in the related art mentioned above, at the location of the tag tape where each RFID circuit element is arranged, the respective layers forming the tag tape are extended and bent to both sides in the thickness direction so as to detour around the RFID circuit element. At this time, if the ratio of the sum of the thickness dimensions of the respective layers to the thickness dimension of the RFID circuit element is small, the above-mentioned bend becomes large, which may cause wrinkles to form in the tag tape at the location where each RFID circuit element is arranged. On the other hand, as described above, the tag tape is wound into a roll at the time of its manufacture. Accordingly, if the overall thickness of the tape becomes too large, the difference between the inner and outer circumferences of the tape at the time of winding the tape increases, so wrinkles are liable to form. Further, the rigidity may become so high that it is difficult to perform the above-mentioned winding operation of the tape.

In view of the above, to use the tag tape by winding it into a roll while suppressing the formation of wrinkles, the ratio of the sum of the thickness dimensions of respective layers forming the tag tape to the thickness dimension of the RFID circuit element must be set within an appropriate range.

SUMMARY OF THE INVENTION

An object of the present disclosure is to provide a tag tape and a tag label tape with print in which wrinkles do not easily form and which can be actually used in practice.

Means for Solving the Problem

In order to achieve the above-mentioned object, according to first aspect, there is provided a tag tape including: a plurality of RFID circuit elements each including an IC circuit part that stores information and an antenna connected to the IC circuit part; and a first tape medium and a second tape medium that are arranged so as to sandwich each of the RFID circuit elements from both sides in a thickness direction, the first tape medium and the second tape medium having their thickness dimensions set so that $0.8 \leq x/y \leq 9.8$, where x is the sum of the thickness dimensions of the first tape medium and the second tape medium, and y is a thickness dimension of the RFID circuit element.

In the case where the tag tape is formed by sandwiching the plurality of RFID circuit elements by the first tape medium and the second tape medium each having a substantially tape-like configuration, at the location of the tag tape where each RFID circuit element is arranged, the first tape medium and the second tape medium sandwich the RFID circuit element therebetween and hence are extended and bent to both sides in the thickness dimension so as to detour around the RFID circuit element, resulting in an increase in the thickness dimension of the tape as a whole as compared with the locations of the tag tape where no RFID circuit element is arranged. As the bend required to detour around the RFID circuit element becomes larger, or as the thickness dimension of the tape as a whole decreases, wrinkles are more liable to develop in respective portions of the tag tape. In the first aspect of the present application, by setting the ratio of the sum x of the thickness dimensions of the first and second tape media to the thickness dimension y of the RFID circuit element to be 0.8 or more to make the first and second tape media thick relative to the RFID circuit element, the influence of the sandwiching of the RFID circuit element at the arrangement location of the RFID circuit element can be reduced to thereby prevent the formation of wrinkles.

On the other hand, such a tag tape equipped with the first tape medium, the RFID circuit element, and the second tape medium is often wound into a roll at the time of its manufacture. Further, when using the tag tape, in the tag-label producing device, the tag tape is paid out from the roll and fed while having its feed path deflected. Accordingly, when the overall thickness of the tape becomes too large, the rigidity becomes so high that it is difficult to perform the above-mentioned operations such as winding of the tag tape into a roll, deflection of the feed path, and the like. In the first aspect of the present application, by setting the ratio of the sum x of the thickness dimensions of the first and second tape media to the thickness dimension y of the RFID circuit element to be 9.8 or less, an excessive increase in rigidity due to the above-mentioned increase in thickness dimension is prevented, thereby making it possible to smoothly perform the winding and feeding of the tag tape.

In this way, in the first aspect of the present application, the ratio of the sum x of the thickness dimensions of the first and second tape media to the thickness dimension y of the RFID circuit element is set to be within an appropriate range, thereby making it possible to realize a tag tape in which wrinkles do not easily form and which can be actually used in practice.

According to second aspect, in the first aspect, $0.8 \leq x/y \leq 8.2$.

In the case where the tag tape is formed by sandwiching the plurality of RFID circuit elements by the first tape medium and the second tape medium each having a substantially tape-like configuration, at the location of the tag tape where each RFID circuit element is arranged, the first tape medium and the second tape medium sandwich the RFID circuit element therebetween and hence are extended and bent to both sides in the thickness dimension so as to detour around the RFID circuit element, resulting in an increase in the thickness dimension of the tape as a whole as compared with the locations of the tag tape where no RFID circuit element is arranged. As the bend required to detour around the RFID circuit element becomes larger, or as the thickness dimension of the tape as a whole decreases, wrinkles are more liable to develop in respective portions of the tag tape. In the second aspect of the present application, by setting the ratio of the sum x of the thickness dimensions of the first and second tape media to the thickness dimension y of the RFID circuit element to be 0.8 or more to make the first and second tape media thick relative to the RFID circuit element, the influence of the sandwiching of the RFID circuit element at the arrangement location of the RFID circuit element can be reduced to thereby prevent the formation of wrinkles.

On the other hand, such a tag tape equipped with the first tape medium, the RFID circuit element, and the second tape medium is often wound into a roll at the time of its manufacture. Further, when using the tag tape, in the tag-label producing device, the tag tape is paid out from the roll and fed while having its feed path deflected. Accordingly, when the overall thickness of the tape becomes too large, the rigidity becomes so high that it is difficult to perform the above-mentioned operations such as winding of the tag tape into a roll, deflection of the feed path, and the like. In the second aspect of the present application, by setting the ratio of the sum x of the thickness dimensions of the first and second tape media to the thickness dimension y of the RFID circuit element to be 8.2 or less, an excessive increase in rigidity due to the above-mentioned increase in thickness dimension is prevented, thereby making it possible to smoothly perform the winding and feeding of the tag tape.

In this way, in the second aspect of the present application, the ratio of the sum x of the thickness dimensions of the first and second tape media to the thickness dimension y of the RFID circuit element is set to be within an appropriate range, thereby making it possible to realize a tag tape in which wrinkles do not easily form and which can be actually used in practice.

According to third aspect, in the second aspect, the first tape medium includes a first tape base layer of a substantially tape-like configuration for arranging the RFID circuit element thereon, a bonding adhesive material layer that bonds the first tape base layer onto a print-receiving medium as a target bonding object, and a first mounting adhesive material layer that mounts the RFID circuit element to the first tape base layer; and the second tape medium includes a first affixing adhesive layer that affixes the entirety of the tag tape onto a target affixing object, and a first separation material layer that covers the affixing side of the affixing adhesive material layer and is peeled off at the time of affixation.

By adopting a structure in which, using the first tape medium of a laminate structure including the first tape base layer, the bonding adhesive material layer, and the first mounting adhesive material layer, and the second tape medium of a laminate structure including the first affixing adhesive material layer and the first separation material layer, the RFID circuit element is sandwiched by these first tape medium and second tape medium, it is possible to realize a tag tape that is to be bonded with the print-receiving tape through the bonding adhesive material layer to form a tag label tape with print. By adopting the structure in which the tag tape is bonded with the print-receiving tape, the tag tape can be bonded from the bonding side onto the print receiving surface on which printing has been performed. In this case, since the print surface is not exposed to the tape surface, it is possible to realize a tag label tape with print that is highly resistant to stain and moisture. Further, in the tag tape of this type, by setting the ratio of the sum x of the thickness dimensions of the first and second tape media to the thickness dimension y of the RFID circuit element to be within an appropriate range, it is possible to realize a tag tape in which wrinkles do not easily form and which can be actually used in practice.

According to fourth aspect, in the third aspect, the second tape medium further includes a second tape base layer arranged so as to be located between the RFID circuit element and the first affixing adhesive material layer.

Since the RFID circuit element is interposed between the first tape base layer and the second tape base layer, it is possible to realize a structure in which, for example, even when the user strips off the separation sheet after forming the tag label, the RFID circuit element is not directly visible due to the second tape base layer.

According to fifth aspect, in the fourth aspect, the second tape medium further includes a second mounting adhesive material layer arranged on the first tape base layer side of the second tape base layer, that sandwiches the RFID circuit element in cooperation with the first mounting adhesive material layer.

Accordingly, in the structure in which the RFID circuit element is interposed between the first tape base layer and the second tape base layer, the adhesive material layer can be provided also on the second tape base layer side of the RFID circuit element, thereby making it possible to arrange the RFID circuit element in place more securely and stably.

According to sixth aspect, in the first aspect, $1.1 \leq x/y \leq 9.8$.

In the case where the tag tape is formed by sandwiching the plurality of RFID circuit elements by the first tape medium and the second tape medium each having a substantially tape-like configuration, at the location of the tag tape where each RFID circuit element is arranged, the first tape medium and the second tape medium sandwich the RFID circuit element therebetween and hence are extended and bent to both sides in the thickness dimension so as to detour around the RFID circuit element, resulting in an increase in the thickness dimension of the tape as a whole as compared with the locations of the tag tape where no RFID circuit element is arranged. As the bend required to detour around the RFID circuit element becomes larger, or as the thickness dimension of the tape as a whole decreases, wrinkles are more liable to develop in respective portions of the tag tape. In the sixth aspect of the present application, by setting the ratio of the sum x of the thickness dimensions of the first and second tape media to the thickness dimension y of the RFID circuit element to be 1.1 or more to make the first and second tape media thick relative to the RFID circuit element, the influence of the sandwiching of the RFID circuit element at the arrangement location of the RFID circuit element can be reduced to thereby prevent the formation of wrinkles.

On the other hand, such a tag tape equipped with the first tape medium, the RFID circuit element, and the second tape medium is often wound into a roll at the time of its manufacture. Further, when using the tag tape, in the tag-label producing device, the tag tape is paid out from the roll and fed while having its feed path deflected. Accordingly, when the overall thickness of the tape becomes too large, the rigidity becomes so high that it is difficult to perform the above-mentioned operations such as winding of the tag tape into a roll, deflection of the feed path, and the like. In the sixth aspect of the present application, by setting the ratio of the sum x of the thickness dimensions of the first and second tape media to the thickness dimension y of the RFID circuit element to be 9.8 or less, an excessive increase in rigidity due to the above-mentioned increase in thickness dimension is prevented, thereby making it possible to smoothly perform the winding and feeding of the tag tape.

In this way, in the sixth aspect of the present application, the ratio of the sum x of the thickness dimensions of the first and second tape media to the thickness dimension y of the RFID circuit element is set to be within an appropriate range, thereby making it possible to realize a tag tape in which wrinkles do not easily form and which can be actually used in practice.

According to seventh aspect, in the sixth aspect, the first tape medium includes a third tape base layer of a tape-like configuration for arranging a plurality of the RFID circuit elements thereon, the third tape base layer including a print area on which predetermined printing has been performed, and a third mounting adhesive material layer that mounts the RFID circuit element to the third tape base layer; and the second tape medium includes a second affixing adhesive material layer that affixes the entirety of the tag tape onto a target affixing object, and a second separation material layer that covers the affixing side of the affixing adhesive material layer and is peeled off at the time of affixation.

By adopting a structure in which, using the first tape medium of a laminate structure including the third tape base layer and the third mounting adhesive material layer, and the second tape medium of a laminate structure including the second affixing adhesive material layer and the second separation material layer, the RFID circuit element is sandwiched by these first tape medium and second tape medium, it is possible to realize a tag tape of an independent structure (=that serves as a tag label tape with print as it is) that is not bonded with another tape. Due to such an independent structure, as compared with the case where a tag label tape with print is formed through bonding with another tape, the construction or control on the tag-label producing device side can be simplified, and the tape structure can be also simplified. Further, in the tag tape of this type, by setting the ratio of the sum x of the thickness dimensions of the first and second tape media to the thickness dimension y of the RFID circuit element to be within an appropriate range, it is possible to realize a tag tape in which wrinkles do not easily form and which can be actually used in practice.

According to eighth aspect, in the seventh aspect, the second tape medium further includes a fourth tape base layer arranged so as to be located between the RFID circuit element and the second affixing adhesive material layer.

Since the RFID circuit element is interposed between the third tape base layer and the fourth tape base layer, it is possible to realize a structure in which, for example, even when the user strips off the separation sheet after forming the tag label, the RFID circuit element is not directly visible due to the fourth tape base layer.

According to ninth aspect, in the eighth aspect, the second tape medium further includes a fourth mounting adhesive material layer arranged on the third tape base layer side of the fourth tape base layer, that sandwiches the RFID circuit element in cooperation with the third mounting adhesive material layer.

Accordingly, in the structure in which the RFID circuit element is interposed between the third tape base layer and the fourth tape base layer, the adhesive material layer can be provided also on the fourth tape base layer side of the RFID circuit element, thereby making it possible to arrange the RFID circuit element in place more securely and stably.

In order to achieve the above-mentioned object, according to tenth aspect, there is provided a tag label tape with print, including: a tag tape having a plurality of RFID circuit elements, and a first tape medium and a second tape medium that are arranged so as to sandwich each of the plurality of RFID circuit elements from both sides in a thickness direction, the plurality of RFID circuit elements each including an IC circuit part that stores information and an antenna connected to the IC circuit part; and a print-receiving tape that includes a print area on which predetermined printing has been performed, and is bonded onto the tag tape, the print-receiving tape having its thickness dimension set so that $1.1 \leqq (\alpha+\beta)/\gamma \leqq 9.8$, where $\alpha$ is a thickness dimension of the print-receiving tape, $\beta$ is the sum of thickness dimensions of the first tape medium and the second tape medium, and $\gamma$ is a thickness dimension of the RFID circuit element.

In the case where the tag tape is formed by sandwiching the plurality of RFID circuit elements by the first tape medium and the second tape medium each having a substantially tape-like configuration, and further the tag label tape with print is formed by bonding the print-receiving tape onto this tag tape, at the location of the tag tape where each RFID circuit element is arranged, the first tape medium and the second tape medium sandwich the RFID circuit element therebetween and hence are extended and bent to both sides in the thickness dimension so as to detour around the RFID circuit element, resulting in an increase in the thickness dimension of the tape as a whole as compared with the locations of the tag tape where no RFID circuit element is arranged. As the bend required to detour around the RFID circuit element becomes larger, or as the thickness dimension of the tag tape as a whole decreases, wrinkles are more liable to develop in respective portions of the tag label tape with print after the bonding, or the print-receiving tape and the tag tape become liable to peel off from each other. In the tenth aspect of the present application, by setting the ratio of the sum $(\alpha+\beta)$ of the sum total $\beta$ of the thickness dimensions of the first and second tape media, and the thickness dimension $\alpha$ of the print-receiving tape to the thickness dimension $\gamma$ of the RFID circuit element to be 1.1 or more to make the first and second tape media thick relative to the RFID circuit element, the influence of the sandwiching of the RFID circuit element at the arrangement location of the RFID circuit element can be reduced to thereby prevent the formation of wrinkles or peeling of the print-receiving tape.

On the other hand, the tag tape of a laminate structure which is equipped with the first tape medium, the RFID circuit element, and the second tape medium, and which constitutes the main part of such a tag label tape with print, is often wound into a roll at the time of its manufacture. Further, when using the tag tape, in the tag-label producing device, the tag tape is paid out from the roll and fed while having its feed path deflected. Accordingly, when the overall thickness of the tag tape (in other words, the thickness of the tag label tape with print) becomes too large, the rigidity becomes so high that it is difficult to perform the above-mentioned operations such as winding of the tag tape into a roll, deflection of the feed path, and the like. In the tenth aspect of the present application, by setting the ratio of the sum $(\alpha+\beta)$ of the sum total $\beta$ of the thickness dimensions of the first and second tape media, and the thickness dimension $\alpha$ of the print-receiving tape to the thickness dimension $\gamma$ of the RFID circuit element to be 9.8 or less, an excessive increase in rigidity due to the above-mentioned increase in thickness dimension is prevented, thereby making it possible to smoothly perform the winding and feeding of the tag tape.

In this way, in the tenth aspect of the present application, the ratio of the sum $(\alpha+\beta)$ of the sum total $\beta$ of the thickness dimensions of the first and second tape media, and the thickness dimension $\alpha$ of the print-receiving tape to the thickness dimension $\gamma$ of the RFID circuit element is set to be within an appropriate range, thereby making it possible to realize a tag label tape with print in which wrinkles do not easily form and which can be actually used in practice.

In accordance with the present aspect, it is possible to realize a tag tape and a tag label tape with print, in which wrinkles do not easily form and which can be actually used in practice.

BRIEF DESCRIPTION OF THE DRAWINGS

FIG. 1 is a system configuration diagram showing an RFID tag manufacturing system equipped with a tag-label producing device according to an embodiment of the present disclosure.

FIG. 2 is a perspective view showing the overall construction of the tag-label producing device.

FIG. 3 is a perspective view showing the construction of an internal unit of the tag-label producing device.

FIG. 4 is a plan view showing the construction of the internal unit.

FIG. 5 is an enlarged plan view schematically showing the detailed construction of a cartridge.

FIG. 6 is a diagram as seen in the direction of the arrow D of FIG. 5, showing the conceptual structure of an RFID circuit element equipped in a base tape paid out from a first roll.

FIG. 7 is a partially extracted perspective view showing the detailed construction of the main potion of a label discharge mechanism.

FIG. 8 is a perspective view showing the outward appearance of the internal unit, with the label discharge mechanism removed from the construction shown in FIG. 3.

FIG. 9 is a perspective view showing the outward appearance of a cutting mechanism, with a half-cutter removed from the internal unit.

FIG. 10 is a perspective view showing the outward appearance of the cutting mechanism, with the half-cutter removed from the internal unit.

FIG. 11 is a perspective view showing the detailed construction of a movable blade and stationary blade together with a half-cut unit.

FIG. 12 is a partial enlarged sectional view of the detailed construction of the movable blade and stationary blade.

FIG. 13 is a front view showing the outward appearance of the movable blade.

FIG. 14 is a cross-sectional view taken along the line A-A of FIG. 13.

FIG. 15 is a functional block diagram showing the control system of the tag-label producing device.

FIG. 16 is a simplified circuit diagram showing the circuit configuration of the connecting portion between a transmitting circuit, a receiving circuit, and a loop antenna.

FIG. 17 is a functional block diagram showing the functional configuration of the RFID circuit element.

FIG. 18A is respectively a top view showing an example of the outward appearance of an RFID label formed after completing writing (or reading) of information to the RFID circuit element and cutting of the tag label tape with print by the tag-label producing device.

FIG. 18B is respectively a bottom view showing an example of the outward appearance of an RFID label formed after completing writing (or reading) of information to the RFID circuit element and cutting of the tag label tape with print by the tag-label producing device.

FIG. 19 is a view obtained by rotating a cross-sectional view, which is taken along the line IXX-IXX' of FIG. 18, counterclockwise by 90°.

FIG. 20 is a view showing an example of the screen displayed on the PC when making access to (performing reading or writing of) RFID tag information of an IC circuit part of the RFID circuit element by the tag-label producing device.

FIG. 21 is a diagram schematically illustrating the layer structure of a tag label tape with print (base tape) in the case where the ratio is set to be large, and also showing the thickness dimensions of respective layers, and the ratio of the sum of the thickness dimensions of the respective layers to the thickness dimension of the RFID circuit element.

FIG. 22 is a diagram schematically illustrating the layer structure of a tag label tape with print (base tape) in the case where the ratio is set to be relatively large, and also showing the thickness dimensions of respective layers, and the ratio of the sum of the thickness dimensions of the respective layers to the thickness dimension of the RFID circuit element.

FIG. 23 is a diagram schematically illustrating the layer structure of a tag label tape with print (base tape) in the case where the ratio is set to be relatively small, and also showing the thickness dimensions of respective layers, and the ratio of the sum of the thickness dimensions of the respective layers to the thickness dimension of the RFID circuit element.

FIG. 24 is a diagram schematically illustrating the layer structure of a tag label tape with print (base tape) in the case where the ratio is set to be small, and also showing the thickness dimensions of respective layers, and the ratio of the sum of the thickness dimensions of the respective layers to the thickness dimension of the RFID circuit element.

FIG. 25 is a table summarizing the results of examination made by the present inventors with respect to Case 1 to Case 4.

FIG. 26 is a plan view showing the detailed construction of a cartridge according to a modification in which tape bonding is not performed.

FIG. 27 is a diagram schematically illustrating the layer structure of a tag label tape with print (base tape) in the case where the ratio is set to be large, and also showing the thickness dimensions of respective layers, and the ratio of the sum of the thickness dimensions of the respective layers to the thickness dimension of the RFID circuit element.

FIG. 28 is a diagram schematically illustrating the layer structure of a tag label tape with print (base tape) in the case where the ratio is set to be relatively large, and also showing the thickness dimensions of respective layers, and the ratio of the sum of the thickness dimensions of the respective layers to the thickness dimension of the RFID circuit element.

FIG. 29 is a diagram schematically illustrating the layer structure of a tag label tape with print (base tape) in the case where the ratio is set to be relatively small, and also showing the thickness dimensions of respective layers, and the ratio of the sum of the thickness dimensions of the respective layers to the thickness dimension of the RFID circuit element.

FIG. 30 is a diagram schematically illustrating the layer structure of a tag label tape with print (base tape) in the case where the ratio is set to be small, and also showing the thickness dimensions of respective layers, and the ratio of the sum of the thickness dimensions of the respective layers to the thickness dimension of the RFID circuit element.

FIG. 31 is a table summarizing the results of examination made by the present inventors with respect to Case 5 to Case 8.

DETAILED DESCRIPTION OF THE PREFERRED EMBODIMENTS

A tag tape and a tag tape with print according to an embodiment of the present disclosure will be described below with reference to the drawings.

FIG. 1 is a system diagram showing an RFID tag manufacturing system equipped with a tag-label producing device for producing a tag label using the tag tape according to an embodiment of the present disclosure.

In an RFID tag manufacturing system TS shown in FIG. 1, a tag-label producing device 1 is connected to a route server RS, a plurality of information servers IS, a terminal 118a, and a general purpose computer 118b via a wired or wireless communication line NW. It should be noted that in the following description, the terminal 118a and the general purpose computer 118b will be generically referred to simply as "PC 118" as appropriate.

FIG. 2 is a perspective view showing the overall construction of the above-mentioned tag-label producing device 1.

In FIG. 2, the tag-label producing device 1 is connected to the PC 118 and produces an RFID label with a desired print on the basis of operation from the PC 118. The tag-label producing device 1 includes a main body 2, and an open/close cover 3 provided to the upper surface of the main body 2 so as to freely open and close.

The main body 2 is located on the forward side (the left forward side in FIG. 2), and includes a side wall 10 (housing) equipped with a label discharge port 11 (discharge port) for discharging an RFID label T (which will be described later) produced inside the main body 2, and a side cover 12 that is provided in the portion of the side wall 10 below the label discharge port 11 and whose lower end is rotatably supported in place.

The side cover 12 includes a pressing portion 13. The side cover 12 opens forward by pressing the pressing portion 13 from above. Further, a power supply button 14 for turning on/off the power supply of the tag-label producing device 1 is provided in the portion of the side wall 10 below an open/close button 4. Provided below the power supply button 14 is a cutter driving button 16 for driving a cutting mechanism 15 (see FIG. 3 that will be described later) disposed inside the main body 2 through manual operation by the user. When the button 16 is pressed, a tag label tape 109 with print (which will be described later) is cut into a predetermined length, thereby producing an RFID label T.

The open/close cover 3 is rotatably pivoted on the end of the main body 2 on the right rear side in FIG. 2, and always urged in the opening direction via an urging member such as a spring. When the open/close button 4 arranged in the upper surface of the main body 2 so as to be adjacent to the open/close cover 3 is pressed, the locking engagement between the open/close cover 3 and the main body 2 is released, causing the open/close cover 3 to open due to the operation of the urging member. It should be noted that a see-through window 5 covered with a transparent cover is provided at the central side portion of the open/close cover 3.

FIG. 3 is a perspective view showing the construction of an internal unit 20 of the tag-label producing device 1 (however, a loop antenna LC that will be described later is omitted). In FIG. 3, the internal unit 20 generally includes a cartridge holder 6 accommodating a cartridge 7 (RFID-circuit-element accommodating member), a printing mechanism 21 equipped with a print head (thermal head) 23, the cutting mechanism 15, a half-cut unit 35 (see FIG. 4 that will be described later), and a label discharge mechanism 22 for discharging the produced RFID label T (see FIG. 18 that will be described later) from the label discharge port 11 (see FIG. 2).

FIG. 4 is an enlarged plan view showing the construction of the internal unit 20 shown in FIG. 3, and FIG. 5 is an enlarged plan view schematically showing the detailed construction of the cartridge 7.

In FIGS. 4 and 5, the cartridge holder 6 accommodates the cartridge 7 so that the orientation in the width direction of the tag label tape 109 with print discharged from the label discharge port 11 becomes perpendicular. The cartridge 7 has a housing 7A, a first roll 102 arranged inside the housing 7A and around which a base tape 101 having a band-like shape is wound, a second roll 104 around which a transparent cover film 103 of substantially the same width as the base tape 101 is wound, a ribbon-supply-side roll 111 for paying out an ink ribbon 105 (thermal transfer ribbon; unnecessary when the print-receiving tape used is a thermal tape), a ribbon take-up roller 106 for taking up the ink ribbon 105 after printing, a tape feed roller 27 rotatably supported near a tape discharging portion 30 of the cartridge 7, and a guide roller 112 that functions as feed-position regulating means.

The tape feed roller 27 presses the base tape 101 and the cover film 103 into adhesion with each other to thereby prepare the tag label tape 109 with print, and feeds the tag label tape 109 with print in the direction indicated by the arrow A (=also functions as a pressure roller).

The first roll 102 has the base tape 101 wound around a reel member 102a. The base tape 101 has a plurality of RFID circuit elements To successively formed at predetermined equal intervals in the longitudinal direction thereof. The base tape 101 is of a five-layer structure in this example (see the partially enlarged view in FIG. 5). The base tape 101 includes an adhesive layer 101a made of a suitable adhesive material, a colored base film 101b made of PET (polyethylene terephthalate) or the like, an adhesive layer 101e made of a suitable adhesive material, an adhesive layer 101c made of a suitable adhesive material, and a separation sheet 101d, which are laminated in the stated order from the side wound on the inner side (the right side in FIG. 5) toward the side opposite thereto (the left side in FIG. 5).

On the back side (the left side in FIG. 5) of the base film 101b, a loop antenna 152 that is formed in a loop coil-like configuration and performs transmission/reception of information is provided via the above-mentioned adhesive layer 101e, with an IC circuit part 151 for storing information being formed so as to connect to the loop antenna 152. These components constitute each RFID circuit element To.

The above-mentioned adhesive layer 101a for adhering the cover film 103 later is formed on the front side (the right side in FIG. 5) of the base film 101b. Further, on the back side (the left side in FIG. 5) of the base film 101b, the separation sheet 101d is adhered onto the base film 101b by means of the above-mentioned adhesive layer 101e and the adhesive layer 101c provided so as to contain the RFID circuit element To. It should be noted that the separation sheet 101d is peeled off when affixing the finally completed RFID label T having a label-shaped configuration onto a predetermined item or the like, thus allowing adhesion of the RFID label T onto the item or the like by means of the adhesive layer 101c.

The second roll 104 has the cover film 103 wound around a reel member 104a. In the cover film 103 paid out from the second roll 104, the ink ribbon 105 driven by the ribbon-supply-side roll 111, which is arranged on the back surface side (that is, the side where the cover film 103 is adhered onto the base tape 101) of the cover film 103, and the ribbon take-up roller 106 is pressed by the print head 23 into abutment with the back surface of the cover film 103.

The ribbon take-up roller 106 and the tape feed roller 27 are rotationally driven in synchronization with a ribbon take-up roller drive shaft 107 and a tape-feed-roller drive shaft 108 as the drive force of a feed motor 119 (see FIG. 3 and FIG. 15 that will be described later) that is, for example, a pulse motor provided outside the cartridge 7 is transmitted to the ribbon take-up roller drive shaft 107 and the tape-feed-roller drive shaft 108 via a gear mechanism (not shown), respectively.

On the other hand, the print head 23 equipped with a large number of heater elements is mounted to a head mounting portion 24 provided upright to the cartridge holder 6, and is arranged on the upstream side of the tape feed roller 27 with respect to the feed direction of the cover film 103.

Further, a roller holder 25 is rotatably pivoted by means of a support shaft 29 on the portion of the cartridge holder 6 located forward of the cartridge 7 (the lower side in FIG. 4), and can be switched by means of a switching mechanism between a printing position (abutting position; see FIG. 4) and a release position. A platen roller 26 and a tape pressure-contact roller 28 are rotatably disposed in the roller holder 25. When the roller holder 25 is switched to the above-mentioned printing position, the platen roller 26 and the tape pressure-contact roller 28 are brought into press contact with the print head 23 and the tape feed roller 27, respectively.

In the above-described construction, the base tape 101 paid out from the first roll 102 is supplied to the tape feed roller 27. On the other hand, in the cover film 103 paid out from the second roll 104, the ink ribbon 105 driven by the ribbon-supply-side roll 111, which is arranged on the back surface side (that is, the side where the cover film 103 is adhered onto the base tape 101) of the cover film 103, and the ribbon take-up roller 106 is pressed by the print head 23 into abutment with the back surface of the cover film 103.

When the cartridge 7 is loaded onto the cartridge holder 6 and the roller holder 25 is moved from the release position to the printing position, the cover film 103 and the ink ribbon 105 are held between the print head 23 and the platen roller 26, and also the base tape 101 and the cover film 103 are held between the tape feed roller 27 and the pressure roller 28. Then, due to the drive force of the feed motor 119, the ribbon take-up roller 106 and the tape feed roller 27 are rotationally driven in synchronization with each other in the directions indicated by the arrow B and the arrow C, respectively. At this time, the tape-feed-roller drive shaft 108, and the pressure roller 28 and the platen roller 26 are coupled together by a gear mechanism (not shown). As the tape-feed-roller drive shaft 108 is driven, the tape feed roller 27, the pressure roller 28, and the platen roller 26 rotate, and the base tape 101 is paid out from the first roll 102 and supplied to the tape feed roller 27 as described above. On the other hand, the cover film 103 is paid out from the second roll 104, and the plurality of heater elements of the print head 23 are energized by a print-head drive circuit 120 (see FIG. 15 that will be described later). As a result, a label print R (see FIG. 18 that will be described later), which corresponds to the RFID circuit elements To on the base tape 101 onto which the cover film 103 is to be bonded, is formed on the back surface of the cover film 103. Then, the base tape 101 and the cover film 103 on which printing has been performed as described above are adhered and integrated together by means of the tape feed roller 27 and the pressure roller 28, thus forming the tag label tape 109 with print, which is carried to the outside of the cartridge 7 by the tape discharging portion 30. The ink ribbon 105 for which printing on the cover film 103 has been finished is taken up on the ribbon take-up roller 106 due to the drive of the ribbon take-up roller drive shaft 107.

It should be noted that a tape specific indication portion 8, which indicates, for example, the width, color, and the like of the base tape 101 incorporated in the cartridge 7, is provided in the upper surface of the housing 7A of the cartridge 7. When the cartridge 7 is loaded onto the cartridge holder 6 and the open/close cover 3 is closed, the above-mentioned see-through window 5 and the tape specific indication portion 8 are opposed to each other, thus allowing the tape specific indication portion 8 to be viewed from the outside of the main body 2 through the transparent cover of the see-through window 5. This allows the kind or the like of the cartridge 7 loaded on the cartridge holder 6 to be readily identified visually from the outside of the main body 2 through the see-through window 5.

On the other hand, as described above, the internal unit 20 includes the cutting mechanism 15 and the label discharge mechanism 22. The internal unit 20 further includes a loop antenna LC for performing reading or writing of information via wireless communication with respect to the RFID circuit element To equipped in the base tape 101 (the tag label tape with print after the bonding; the same applies hereinafter). After reading or writing of information from or to the RFID circuit element To is performed by the loop antenna LC with respect to the tag label tape 109 with print produced through the bonding process as described above, the tag label tape 109 with print is cut by the cutting mechanism 15 automatically or by operating the cutter driving button 16 (see FIG. 2), thereby producing the RFID label T. This RFID label T is then further discharged by the label discharge mechanism 22 from the label discharge port 11 formed in the side wall 10 (see FIG. 2).

The cutting mechanism 15 includes a stationary blade 40, a movable blade 41 that is formed by a metal member and performs cutting operation together with the stationary blade 40, a cutter helical gear 42 (see FIG. 3) coupled to the movable blade 41, and a cutter motor 43 (see FIG. 3) coupled to the cutter helical gear 42 through a gear train.

The label discharge mechanism 22 is disposed near the label discharge port 11 provided in the side wall 10 of the main body 2. The label discharge mechanism 22 functions as discharge means for forcibly discharging from the label discharge port 11 the tag label tape 109 with print that has been cut by the cutting mechanism 15 (in other words, the RFID label T; the same applies hereinafter), and also functions as position regulating means for regulating the feed position of the tag label tape 109 with print at a position near the label discharge port 11 (more specifically, at the information reading or writing position by the loop antenna LC). That is, the label discharge mechanism 22 includes a drive roller 51, a pressing roller 52 opposed to the drive roller 51 with the tag label tape 109 with print therebetween, a pressing actuation mechanism portion 53 (see FIG. 3) that is actuated so as to press the pressing roller 52 against the tag label tape 109 with print or to release the pressing, and a discharge drive mechanism portion 54 (see FIG. 3) that operates in synchronization with the pressing release operation of the pressing actuation mechanism portion 53 to rotate the drive roller 51 so that the tag label tape 109 with print is discharged by the drive roller 51.

At this time, first guide walls 55, 56 and second guide walls 63, 64 for guiding the tag label tape 109 with print toward the label discharge port 11 are provided on the inner side of the label discharge port 11 (see FIG. 4). The first guide walls 55, 56 and the second guide walls 63, 64 are respectively formed integrally, and are arranged so as to be spaced apart from each other by a predetermined distance at the discharge position of the tag label tape 109 with print that has been cut by the stationary blade 40 and the movable blade 41.

As shown in FIG. 3 described above, the pressing actuation mechanism portion 53 includes a roller supporting holder 57, a roller supporting portion 58 that is mounted to the roller supporting holder 57 and retains the pressing roller 52 at its distal end portion, a holder supporting shaft 59 that rotatably supports the roller supporting holder 57, a cam 60 that operates in synchronization with the cutting mechanism 15 to drive the pressing actuation mechanism portion 53, and an urging spring 61.

The roller supporting portion 58 is rotatably supported in place so as to sandwich the pressing roller 52 from above and below. When, due to the rotation of the cutter helical gear 42, the roller supporting holder 57 is pivoted counterclockwise (the arrow 71 direction in FIG. 3) about the holder supporting shaft 59 through the cam 60, the pressing roller 52 is pressed against the tag label tape 109 with print. Further, when the cutter helical gear 42 is rotated again, the holder supporting shaft 59 is pivoted in the direction opposite to the above-mentioned direction due to the urging spring 61, thus releasing the pressing roller 52 from the tag label tape 109 with print.

The discharge drive mechanism portion 54 is composed of a tape discharging motor 65 and a gear train 66. After the tag label tape 109 with print is pressed against the drive roller 51 by the pressing roller 52, the tape discharging motor 65 is driven and the drive roller 51 is rotated in the direction for discharging the tag label tape 109 with print, whereby the tag label tape 109 with print is forcibly discharged in the discharging direction.

FIG. 6 is a conceptual diagram as seen in the direction of the arrow D of FIG. 5, showing the conceptual structure of the RFID circuit element To equipped in the base tape 101 paid out from the first roll 102. In FIG. 6, the RFID circuit element To is composed of the loop antenna 152 having a length of L, which is formed in a loop coil-like configuration and performs transmission/reception of information, and the IC circuit part 151 that is connected to the loop antenna 152 and stores information.

FIG. 7 is a partially extracted perspective view showing the detailed construction of the main portion of the label discharge mechanism 22. In FIG. 7, the first guide walls 55, 56 are cut out at their vertically midway portions, with the drive roller 51 being provided to the first guide wall 55 so as to face the discharge position of the tag label tape 109 with print from the cutout portion. It should be noted that the drive roller 51 has a roller cutout portion 51A formed by a concentric groove on its upper surface. On the other hand, in the other first guide wall 56, the pressing roller 52 is supported on the roller supporting portion 58 of the pressing actuation mechanism portion 53 so as to face the discharge position of the tag label tape 109 with print from the cutout portion.

The loop antenna LC (indicated by an imaginary line in FIG. 7) is arranged near the pressing roller 52 with the pressing roller 52 being positioned at the center in the radial direction thereof (on the inner side in the radial direction; more specifically, on the coil center axis X that will be described later). Access to (reading of information from or writing of information to) the RFID circuit element To equipped in the tag label tape 109 with print is performed by magnetic induction (electromagnetic induction, magnetic coupling, and other such non-contact induction method performed via an electromagnetic field).

FIG. 8 is a perspective view showing the outward appearance of the internal unit 20 with the label discharge mechanism 22 removed from the construction shown in FIG. 3.

In FIG. 8, the cutter helical gear 42 is provided with a boss 50 in the form of a projection, and the boss 50 is inserted into an elongated hole 49 of the movable blade 41 (see also FIGS. 9 or 10 that will be described later). Further, on the downstream side of the stationary blade 40 and the movable blade 41 along the tape discharge direction, the half-cut unit 35 is mounted so as to be located between the stationary blade 40 and the movable blade 41, and the first guide walls 55, 56 (see FIG. 4).

The half-cut unit 35 is composed of a pad 38 arranged in alightment with the stationary blade 40, the half-cutter 34 opposed to the pad 38 and arranged on the movable blade 41 side, a first guide portion 36 arranged in alignment with the stationary blade 40 between the stationary blade 40 and the pad 38, and a second guide portion 37 opposed to the first guide portion 36 and arranged in alignment with the movable blade 41 (see also FIG. 11 that will be described later).

The first guide portion 36 and the second guide portion 37 are formed integrally, and mounted to a side plate 44 (see FIG. 4) together with the stationary blade 40 by means of a guide fixing portion 36A provided at a position corresponding to a fixing hole 40A (see FIG. 11 that will be described later) of the stationary blade 40.

The pad 38 is bent so that its end portion opposed to the tag label tape 109 with print discharged from the tape discharge portion 30 becomes parallel to the tape, thus forming a receiving surface 38B. At this time, as described above, the tag label tape 109 with print is of a six-layer structure obtained by bonding together the cover film 103 and the base tape 101 that has a five-layer structure consisting of the adhesive layer 101*a*, the base film 101*b*, the adhesive layer 101*e*, the adhesive layer 101*c*, and the separation sheet 101*d* (see also FIG. 19 that will be described later). Then, by pressing the half-cutter 34 against the receiving surface 38B, the cover film 103, the adhesive layer 101*a*, the base film 101*b*, the adhesive layer 101*e*, and the adhesive layer 101*c* are cut off from the tag label tape 109 with print located between the half-cutter 34 and the receiving surface 38B, and only the separation sheet 101*d* is left uncut. The receiving surface 38B also serves to guide the tag label tape 109 with print toward the label discharge port 11 together with the first guide portions 55, 56.

FIGS. 9 and 10 are perspective views each showing the outward appearance of the cutting mechanism 15 with the half-cutter 34 removed from the internal unit 20.

In FIGS. 9 and 10, in the cutting mechanism 15, when the cutter helical gear 42 is rotated by the cutter motor 43 (see FIG. 3), the movable blade 41 rocks about a shaft hole 48 due to the boss 50 and the elongated hole 49, thereby cutting the tag label tape 109 with print.

That is, first, when the boss 50 of the cutter helical gear 42 is located on the inner side (the left side in FIG. 9), the movable blade 41 is positioned away from the stationary blade 40 (hereinafter, this state will be referred to as the initial state; see FIG. 9). Then, when the cutter motor 43 is driven in this initial state, and the cutter helical gear 42 rotates counterclockwise (the arrow 70 direction), the boss 50 moves to the outer side, and the movable blade 41 pivots counterclockwise (the arrow 73 direction) about the shaft hole 48 to cut the tag label tape 109 with print together with the stationary blade 40 fixed to the internal unit 20 (hereinafter, this state will be referred to as the cut state; see FIG. 10).

After the tag label tape 109 with print is cut in this way to produce an RFID label, it is necessary to return the movable blade 41 to the initial state in order to cut the next tag label tape 109 with print that is fed. Accordingly, the cutter motor 43 is driven again to rotate the cutter helical gear 42 counterclockwise (the arrow 70 direction), so the boss 50 is moved to the inner side again and the movable blade 41 pivots clockwise (the arrow 74 direction), thus separating the movable blade 41 away from the stationary blade 40 (see FIG. 9). This makes the movable blade 41 ready for cutting the next tag label tape 109 with print to be printed and fed by the cartridge 7.

It should be noted that at this time, a cutter helical gear cam 42A is provided on the cylindrical outer wall of the cutter helical gear 42. When the cutter helical gear 42 is rotated by the cutter motor 43, a micro switch 126 that is provided adjacent to the cutter helical gear 42 is switched from the OFF state to the ON state through the operation of the cutter helical gear cam 42A. The cut state of the tag label tape 109 with print can be thus detected.

FIG. 11 is a perspective view showing the detailed construction of the movable blade 41 and stationary blade 40 together with the half-cut unit 35. FIG. 12 is a partial enlarged sectional view of FIG. 11. In FIGS. 11 and 12, the stationary blade 40 is fixed to the side plate 44 (see FIG. 4), which is provided upright on the left side of the cartridge holder 6 inside the cutting mechanism 15, through the fixing hole 40A by fixing means such as a screw or the like.

The movable blade 41 is substantially V-shaped and includes a blade portion 45 provided at the cutting part, a handle portion 46 located opposite to the blade portion 45, and a bent portion 47. The shaft hole 48 is provided in the bent portion 47, and the movable blade 41 is supported onto the side plate 44 at the shaft hole 48 so as to be pivotable about the bent portion 47. Further, the elongated hole 49 is formed in the handle potion 46 on the side opposite to the blade portion 45 provided at the cutting part of the movable blade 41. The blade portion 45 is formed by a two-step blade whose blade surface includes two inclined surfaces of different inclination angles, namely a first inclined surface 45A and a second inclined surface 45B, which cause the thickness of the blade portion 45 to gradually decrease.

On the other hand, an end portion 36B of the first guide portion 36 of the above-described half-cut unit 35 which is opposed to the discharged tag label tape 109 with print is projected along the receiving surface 38B formed at an end portion of the pad 38, and is bent in the discharging direction of the tag label tape 109 with print. At the end portion 36B of the first guide portion 36, a contact surface 36C with the tag label tape 109 with print discharged from the cartridge 7 has a gently curved surface with respect to the discharge direction of the tag label tape 109 with print.

Since the end portion 36B of the first guide portion 36 is projected and the contact surface 36C is formed as a curved surface, the leading end portion of the tag label tape 109 with print curled at a predetermined curvature or more first comes into abutment with the contact surface 36C of the first guide portion 36. At this time, when the leading end portion of the tag label tape 109 with print abuts a position on the downstream side (the lower side in FIG. 12) in the discharge direction of the tag label tape 109 with print with respect to a boundary point 75 on the contact surface 36C of the first guide portion, the leading end portion of the tag label tape 109 with print moves to the downstream side along the curved surface, whereby the tag label tape 109 with print is guided toward the label discharge port 11 without entering between the stationary blade 40 and the first guide portion 36 or the pad 38.

Further, the first guide portion 36 is formed so that its guide width L1 (see FIG. 11) corresponding to the feed path of the tag label tape 109 with print is larger than the maximum width of the tag label tape 109 with print to be loaded (36 mm in the embodiment), and an inner surface 36D is formed so as to extend continuous to the contact surface 36C. The inner surface 36D is formed so as to be opposed to the first and second inclined surfaces 45A, 45B (details of which will be described later) of the movable blade 41. When performing cutting, the first and second inclined surfaces 45A, 45B of the movable blade 41 partially abut the inner surface 36D (see FIG. 12). Since the blade portion of the movable blade 41 is formed by a two-step blade as described above, upon cutting the tag label tape 109 with print by the movable blade 41, a gap 39 is formed between each of the contact surface 36C, which corresponds to the end portion of the first guide portion 36, and the inner surface 36D, and the second inclined surface 45B of the movable blade 41 (see FIG. 12).

FIG. 13 is a front view showing the outward appearance of the movable blade 41, and FIG. 14 is a cross-sectional view taken along the line A-A of FIG. 13.

In FIGS. 13 and 14, the angle formed between the first inclined surface 45A and the back surface of the blade portion 45 on the side opposite to the first inclined surface 45A is 50 degrees in this embodiment.

FIG. 15 is a functional block diagram showing the control system of the tag-label producing device 1 according to this embodiment. In FIG. 15, a control circuit 110 is arranged on a control board (not shown) of the tag-label producing device 1.

The control circuit 110 includes a CPU 111 that has a timer 111A provided therein and controls respective devices, an input/output interface 113 that is connected to the CPU 111 through a data bus 112, a CGROM 114, ROMs 115, 116, and a RAM 117.

In the CGROM 114, dot pattern data for display is stored in correspondence with code data with respect to each of a large number of characters.

In the ROM (dot pattern data memory) 115, dot pattern data is stored with respect to each of a large number of characters for printing characters such as alphabet letters or signs while being classified into respective typefaces (gothic type typeface, Mincho typeface, and the like) in correspondence with the size of the print letter for each typeface. Graphic pattern data for printing graphic images including grayscale expressions are also stored in the ROM 115.

The ROM 116 stores a print drive control program for driving the print head 23, the feed motor 119, and the tape discharging motor 65 by reading data of a print buffer in correspondence with code data of characters such as letters or numerals input from the PC 118, a pulse number determining program for determining the number of pulses corresponding to the amount of energy for forming each print dot, a cutting drive control program for driving the feed motor 119 upon the completion of printing to feed the tag label tape 109 with print to the cutting position, and driving the cutter motor 43 to cut the tag label tape 109 with print, a tape discharging program for forcibly discharging the cut tag label tape 109 with print (=RFID label T) through the tape discharge port 11 by driving the tape discharging motor 65, and other various programs necessary for controlling the tag-label producing device 1. The CPU 111 performs various computations on the basis of these various programs that are stored in the ROM 116.

The RAM 117 is provided with a text memory 117A, a print buffer 117B, a parameter storing area 117E, and the like. The text memory 117A stores document data input from the PC 118. The print buffer 117B stores as dot pattern data a plurality of dot patterns for printing letters, signs, and the like, or the number of applied pulses representing the amount of energy for forming each dot. The print head 23 performs dot printing in accordance with the dot pattern data stored in the print buffer 117B. Various computation data are stored in the parameter storing area 117E.

Connected to the input/output interface 113 are the PC 118, the print-head drive circuit 120 for driving the print head 23, a feed-motor drive circuit 121 for driving the feed motor 119, a cutter-motor drive circuit 122 for driving the cutter motor 43, a tape-discharging-motor drive circuit 123 for driving the tape discharging motor 65, a transmitting circuit 306 that generates a carrier wave for making access to (performing reading/writing with respect to) the RFID circuit element To via the loop antenna LC, and modulates the carrier wave on the basis of a control signal input from the control circuit 110, a receiving circuit 307 that performs demodulation of a reply signal received from the RFID circuit element To via the loop antenna LC, and outputs the resultant to the control circuit 110, and a tape cut sensor 124 and a cut release sensor 125.

In the control system built around the control circuit 110 as described above, upon input of letter data or the like via the PC 118, the text (document data) thereof is sequentially stored into the text memory 117A, and the print head 23 is driven via the drive circuit 120; the respective heater elements are selectively heated and driven in correspondence with printing dots of one line to thereby perform printing of dot pattern data stored in the print buffer 117B, and in synchronization with this, the feed motor 119 performs tape feed control via the drive circuit 121. Further, the transmitting circuit 306 performs modulation control of the carrier wave on the basis of a control signal from the control circuit 110, and the receiving circuit 307 performs processing on a signal demodulated on the basis of a control signal from the control circuit 110.

The tape cut sensor 124 and the cut release sensor 125 are each composed of the cutter helical gear cam 42A and the micro switch 126 that are provided on the cylindrical outer wall of the cutter helical gear 42 (see FIGS. 9 or 10). More specifically, when the cutter helical gear 42 is rotated by the cutter motor 43, the micro switch 126 is switched from OFF to ON through the operation of the cutter helical gear cam 42A, thus detecting the completion of cutting of the tag label tape 109 with print by the movable blade 45. The above-mentioned process constitutes the tape cut sensor 124. When the cutter helical gear 42 is further rotated, the micro switch 126 is switched from ON to OFF through the operation of the cutter helical gear cam 42A, thus detecting the return of the movable blade 45 to the release position. The above-mentioned process constitutes the cut release sensor 125.

FIG. 16 is a simplified circuit diagram showing the circuit configuration of the connecting portion between each of the transmitting circuit 306 and receiving circuit 307 with the loop antenna LC. In FIG. 16, the transmitting circuit 306 is connected to the device-side loop antenna LC, and the receiving circuit 307 is connected to a capacitor 310 that is connected in series with the device-side loop antenna LC.

FIG. 17 is a functional block diagram showing the functional configuration of the RFID circuit element To. In FIG. 17, the RFID circuit element To includes the loop antenna 152 for performing transmission/reception of a signal to/from the loop antenna LC on the tag-label producing device 1 side by magnetic induction in a non-contact manner, and the IC circuit part 151 connected to the loop antenna 152.

The IC circuit part 151 includes a rectification part 153 for rectifying the carrier wave received by the loop antenna 152, a power source part 154 for storing the energy of the carrier wave rectified by the rectification part 153 to use the stored energy as a drive power source, a clock extraction part 156 for extracting a clock signal from the carrier wave received by the loop antenna 152 and supplying it to a control unit 155, a memory part 157 capable of storing a predetermined information signal, a modem part 158 connected to the loop antenna 152, and the control unit 155 for controlling the actuation of the RFID circuit element To via the rectification part 153, the clock extraction part 156, the modem part 158, and the like.

The modem part 158 performs demodulation of a communication signal from the loop antenna LC of the tag-label producing device 1 received by the loop antenna 152, and on the basis of a reply signal from the control unit 155, modulates and reflects the carrier wave received by the loop antenna 152.

The control unit 155 executes a basic control, such as interpreting the received signal demodulated by the modem part 158, generating a reply signal on the basis of an information signal stored in the memory part 157, and returning the reply signal by the modem part 158.

FIG. 18A and FIG. 18B are views each showing an example of the outward appearance of the RFID label T formed after completing writing (or reading) of information to the RFID circuit element To and cutting of the tag label tape 109 with print. FIG. 18A is a top view, and FIG. 18B is a bottom view. Further, FIG. 19 is a cross-sectional view taken along the line XX-XX' of FIG. 18.

In FIGS. 18A, 18B, and 19, as described above, the RFID label T is of a six-layer structure with the cover film 103 added to the five-layer structure shown in FIG. 5. The six layers consist of the cover film 103, the adhesive layer 101a, the base film 101b, the adhesive layer 101c, the adhesive layer 101e, and the separation sheet 101d that are laminated in the stated order from the cover film 103 side (the upper side in FIG. 19) toward the side opposite thereto (the lower side in FIG. 19). Further, as described above, the RFID circuit element To including the loop antenna 152 provided on the back side of the base film 101b is equipped inside each of the adhesive layer 101e and adhesive layer 101c, and the label print R (in this example, the letters "RF-ID" indicating the kind of the RFID label T) is printed on the back surface of the cover film 103.

FIG. 20 is a view showing an example of the screen displayed on the PC 118 (the terminal 118a or the general purpose computer 118b) mentioned above when making access to (performing reading from or writing to) the RFID tag information of the IC circuit part 151 of the RFID circuit element To by the tag-label producing device 1 as described above.

In FIG. 20, in this example, the tag label kind (access frequency and tape dimensions), the label print R printed in correspondence with the RFID circuit element To, an access (reading or writing) ID as identification information (tag ID) unique to that RFID circuit element To, the address of item information stored in the information server IS, and the storage destination addresses of those corresponding information in the route serer RS, and the like can be displayed on the PC 118. Through operation on the PC 118, the tag-label producing device 1 is activated and the label print R is printed onto the cover film 103, and also information such as the reading ID or item information is written to the IC circuit part 151 (or information such as the reading ID or item information previously stored in the IC circuit part 151 is read).

It should be noted that at the time of performing reading and writing as described above, the correspondence between the tag ID of the RFID circuit element To of the produced RFID label T and information read from the IC circuit part 151 (or information written into the IC circuit part 151) of that RFID label T is stored in the route server RS described above and can be referenced as required.

In the basic configuration as described above, the most prominent feature of this embodiment resides in that the thickness dimensions of the respective layers of the base tape 101 and the thickness dimension of the RFID circuit element To are set so that the ratio c of the sum of the thickness dimensions of the respective layers (the above-mentioned adhesive layer 101a, base film 101b, adhesive layer 101e, adhesive layer 101c, and separation sheet 101d) of the base tape 101 to the thickness dimension of the RFID circuit element To is within the range of $0.8 \leq c \leq 8.2$. This will be described in detail below.

In the case where, like the above-mentioned base tape 101, the base tape has the RFID circuit elements To provided therein, at the location of the base tape 101 where each RFID circuit element To is arranged, the respective layers (that is, the adhesive layer 101a, the base film 101b, the adhesive layer 101e, the adhesive layer 101c, and the separation sheet 101d) forming the base tape 101 are extended and bent to both sides in the thickness direction so as to detour around the RFID circuit element To. At this time, if the ratio of the sum of the thickness dimensions of the respective layers to the thickness dimension of the RFID circuit element To is small, the above-mentioned bend becomes large, so wrinkles may develop in the base tape 101 at the location where each RFID circuit element To is arranged. On the other hand, as described above, the base tape 101 is wound into a roll as the first roll 102 inside the cartridge 7, and at the time of label production, the base tape 101 is paid out from the first roll 102 and fed while having its feed path deflected. Accordingly, if the overall thickness of the tape becomes too large, the difference between the inner and outer circumferences of the tape at the time of winding the tape increases, so wrinkles are liable to form. Further, the rigidity may become so high that it is difficult to perform the above-mentioned operations such as the winding of the tape into a roll, the deflection of the feed path, or the like. Therefore, to suppress the formation of wrinkles in the base tape 101 while using the base tape 101 in a rolled state to facilitate the deflection of the feed path, the above-mentioned ratio c of the sum of the thickness dimensions of the respective layers to the thickness dimension of the RFID circuit element To must be set within an appropriate range.

In view of this, using the tag-label producing device 1 constructed as described above, the present inventors have produced various tag labels while varying the above-mentioned ratio c of the sum of the thickness dimensions of the respective layers to the thickness direction of the RFID circuit element To, and made examination on the produced tag labels with respect to the above-mentioned formation of wrinkles and rigidity. The results of this examination will be described below.

FIG. 21 is a diagram schematically illustrating the layer structure of a tag label tape 109A with print (base tape 101A) in the case where the above-mentioned ratio c is set to be large (hereinafter, referred to as the "Case 1"). FIG. 21 also shows the thickness dimensions of respective layers, and the ratios c and c' each representing the ratio of the sum of the thickness dimensions of the respective layers to the thickness dimension of the RFID circuit element To.

As shown in FIG. 21, in Case 1 mentioned above, the base tape 101A (comprising first and second tape members) includes, as viewed from its front side (the upper side in FIG. 21), bonding adhesive layer of the first tape member 101a, base film of the first tape member 101b, mounting adhesive layer of the first tape member 101e, along with mounting adhesive layer of the second tape member 101g that sandwiches the RFID circuit element To, base film of the second tape member 101f, affixing adhesive layer of the second tape member 101c for affixing base tape 101A to a target object, and separation sheet 101d that is removed from base tape 101A prior to affixing adhesive layer 101c to the target affixing object. The RFID circuit element To is provided so as to be sandwiched between the mounting adhesive layer 101e of the first tape member and the mounting adhesive layer 101g of the second tape member. Further, the cover film 103 (which is a print receiving tape) is adhered onto the front side of the base tape 101A constructed as described above via the bonding adhesive layer 101a, thereby forming the tag label tape 109A with print.

The present inventors have produced the tag label tape 109A with print (RFID label T) using a tag tape formed while varying the thickness dimension of each of the above-mentioned layers between the minimum value and the maximum value (unit: μm) shown in the drawing. Then, the present inventors have examined each case with respect to the formation of wrinkles and rigidity.

Here, the ratio c of the sum of the thickness dimensions of the respective layers to the thickness dimension of the RFID circuit element To mentioned above is calculated as $c=(B+D+E)/C$. Further, in the case where the thickness dimension of the cover film 103 is also included, the ratio c' of the sum of the thickness dimensions of the respective layers to the thickness dimension of the RFID circuit element To mentioned above is calculated as $c'=(A+B+D+E)/C$. It should be noted that at this time, A denotes the thickness dimension of the cover film 103, B denotes the value of the sum of the thickness dimensions of the adhesive layer 101a, base film 101b, and adhesive layer 101e, D denotes the value of the sum of the thickness dimensions of the adhesive layer 101g, base film 101f, and adhesive layer 101c, E denotes the thickness dimension of the separation sheet 101d, and C denotes the thickness dimension of the RFID circuit element To. In the construction of this Case 1, the minimum value of the above-mentioned ratio c is 1.0 (the minimum value of the ratio c' in the case where the cover film thickness is included is 1.4), and the maximum value thereof is 8.9 (the maximum value of the ratio c' in the case where the cover film thickness is included is 10.5).

As a result of examination with respect to this Case 1, in the construction where the above-mentioned ratio c becomes the maximum value of 8.9 (in the case of the ratio c', 10.5), although no wrinkles formed under the normal state (flat extended state), since the thickness of the base tape 101A becomes too large, the difference between the inner and outer circumferences of the tape when it is wound as the first roll 102 increases, so wrinkles became liable to occur. Further, the rigidity of the base tape 101A (tag label tape 109A with print) became excessively high, making it no longer possible to smoothly perform such operations as the winding of the base tape 101A into a roll, the deflection of the feed path, and the like. Further, there was also a problem in that due to the excessively large thickness of the base tape 101A, it becomes no longer easy to accommodate the first roll 102, which is formed by winding the base tape 101A, into the cartridge housing 7A. On the other hand, in the construction where the above-mentioned ratio c becomes the minimum value of 1.0 (in the case of the ratio c', 1.4), no wrinkles formed under the normal state, and since the thickness of the base tape 101A is relatively small, no wrinkles formed even upon winding the base tape 101A into a roll. Further, since the rigidity is also small, it was possible to smoothly perform such operations as the winding of the base tape 101A into a roll, the deflection of the feed path thereof, and the like.

FIG. 22 is a diagram schematically illustrating the layer structure of a tag label tape 109B with print (base tape 101B) in the case where the above-mentioned ratio c is set to be relatively large (hereinafter, referred to as the "Case 2"). FIG. 22 also shows the thickness dimensions of respective layers, and the ratios c and c' each representing the ratio of the sum of the thickness dimensions of the respective layers to the thickness dimension of the RFID circuit element To.

As shown in FIG. 22, while the base tape 101B (including first and second tape members) (tag label tape 109B with print) of Case 2 mentioned above is of the same layer structure as the base tape 101A (tag label tape 109A with print) of Case 1 described above, the maximum values of the thickness dimensions of bonding adhesive layer 101*a*, mounting adhesive layer 101*e*, mounting adhesive layer 101*g*, and affixing adhesive layer 101*c*, and base film 101*f* are set small. Otherwise, the base tape 101B is of the same construction as the above-mentioned base tape 101A (tag label tape 109A with print).

As a result of examination with respect to Case 2 mentioned above, in both of the construction in which the above-mentioned ratio c becomes the maximum value of 8.2 (in the case of the ratio c', 9.8) and the construction in which the ratio c becomes the minimum value of 1.0 (in the case of the ratio c', 1.4), no wrinkles formed in the base tape 101B (tag label tape 109B with print) under the normal state, and further no wrinkles formed even upon winding the base tape 101B into a roll. Further, the rigidity of the base tape 101B (tag label tape 109B with print) was also appropriate, so it was possible to smoothly perform such operations as the winding of the base tape 101B into a roll, the deflection of the feed path, or the like.

FIG. 23 is a diagram schematically illustrating the layer structure of a tag label tape 109D with print (base tape 101D) in the case where the above-mentioned ratio c is set to be relatively small (hereinafter, referred to as the "Case 3"). FIG. 23 also shows the thickness dimensions of respective layers, and the ratios c and c' each representing the ratio of the sum of the thickness dimensions of the respective layers to the thickness dimension of the RFID circuit element To.

As shown in FIG. 23, in Case 3 mentioned above, the base tape 101D (comprising first and second tape members) includes, as viewed from its front side (the upper side in FIG. 23), bonding adhesive layer 101*a*, base film 101*b*, mounting adhesive layer 101*e*, affixing adhesive layer 101*c*, and separation sheet 101*d*, with the RFID circuit element To being provided so as to be sandwiched between mounting adhesive layer 101*e* and mounting adhesive layer 101*c*. Further, the cover film 103 is adhered onto the front side of the base tape 101D constructed as described above via bonding adhesive layer 101*a*, thereby forming the tag label tape 109D with print. It should be noted that the thickness dimensions of the respective layers of the tag label tape 109D with print in Case 3 are set in the same manner as those of the respective corresponding layers of the tag label tape 109B with print in Case 2 described above. Further, the construction of Case 3 mentioned above corresponds to the layer structure of each of the base tape 101 (see FIG. 5) and produced tag label tape 109 with print (or the RFID label T; see FIG. 19) used in the above-described embodiment. The thickness dimensions of the respective layers of each of the base tape 101 and tag label tape 109 with print (RFID label T) are set in the same manner as those of Case 3.

As a result of examination with respect to Case 3 mentioned above, in both of the construction in which the above-mentioned ratio c becomes the maximum value of 6.4 (in the case of the ratio c', 8.1) and the construction in which the ratio c becomes the minimum value of 0.8 (in the ratio c', 1.1), no wrinkles formed in the base tape 101D (tag label tape 109D with print) under the normal state, and further no wrinkles formed even upon winding the base tape 101D into a roll. Further, the rigidity of the base tape 101D (tag label tape 109D with print) was also appropriate, so it was possible to smoothly perform such operations as the winding of the base tape 101D into a roll, the deflection of the feed path, or the like.

FIG. 24 is a diagram schematically illustrating the layer structure of a tag label tape 109E with print (base tape 101E) in the case where the above-mentioned ratio c is set to be small (hereinafter, referred to as the "Case 4"). FIG. 24 also shows the thickness dimensions of respective layers, and the ratios c and c' each representing the ratio of the sum of the thickness dimensions of the respective layers to the thickness dimension of the RFID circuit element To.

As shown in FIG. 24, while the base tape 101E (tag label tape 109E with print) of Case 4 mentioned above is of the same layer structure as the base tape 101D (tag label tape 109D with print) of Case 3 described above, the minimum values of the thickness dimensions of the adhesive layers 101*a*, 101*e*, and 101*c*, and base film 101*b*, and the maximum value of the thickness dimension of the RFID circuit element To are set small. Otherwise, the base tape 101E is of the same construction as the above-mentioned base tape 101D (tag label tape 109D with print).

As a result of examination with respect to Case 4 mentioned above, in the construction in which the above-mentioned ratio c becomes the maximum value of 6.4 (in the case of the ratio c', 8.1), no wrinkles formed in the base tape 101E (tag label tape 109E with print) under the normal state, and further no wrinkles formed even upon winding the base tape 101E into a roll. Further, the rigidity of the base tape 101E (tag label tape 109E with print) was also appropriate, so it was possible to smoothly perform such operations as the winding of the base tape 101E into a roll, the deflection of the feed path, and the like. On the other hand, in the construction in which the above-mentioned ratio c becomes the minimum value of 0.6 (in the case of the ratio c', 0.9), the thickness dimension of the RFID circuit element To becomes too large relative to the thickness dimension of the tape, so wrinkles formed in the base tape 101E (tag label tape 109E with print) under the normal state.

FIG. 25 is a table summarizing the results of examination made by the present inventors with respect to Case 1 to Case 4 described in the foregoing. As shown in FIG. 25, with the construction of Case 1, favorable results were not obtained both in terms of wrinkle suppression and tape rigidity. Further, with the construction of Case 4, although appropriate rigidity was attained, favorable results were not obtained in terms of wrinkle suppression. However, with the constructions of Case 2 and Case 3, favorable results were obtained both in terms of wrinkle suppression and tape rigidity. From the foregoing, the present inventors have found that such operations as the winding of the base tape 101 into a roll, deflection of the feed path, and the like can be performed smoothly while suppressing wrinkles and without the tape rigidity becoming excessively high, if the ratio c of the sum of the thickness dimensions of the respective layers of the base tape 101 to the thickness dimension of the RFID circuit element To is within the range of $0.8 \leq c \leq 8.2$ ($1.1 \leq c' \leq 9.8$ if the thickness of the cover film is included).

In the tag-label tape 1 according to this embodiment constructed as described above, the predetermined label print R is printed by the print head 23 with respect to the print area S of the cover film 103, the tag label tape 109 with print of a laminate structure including three layers consisting of the cover film 103, the adhesive layer 101c, and the separation sheet 101d covering the adhesive layer 101c is fed, transmission/reception of information is performed by the loop antenna LC in a non-contact manner with respect to the RFID circuit element To equipped in the tag label tape 109 with print to thereby execute reading or writing of information, and the tag label tape 109 with print is cut by the cutting mechanism 15 into a predetermined length to thereby produce the RFID label T.

At this time, in the case where, as in this embodiment, the base tape 101 is formed by sandwiching a plurality of RFID circuit elements To by a plurality of layers (the adhesive layer 101a, the base film 101b, the adhesive layer 101e, the adhesive layer 101c, and the separation sheet 101d), at the location of the base tape 101 where each RFID circuit element To is arranged, due to the construction in which the RFID circuit element To is sandwiched by the respective layers, the respective layers are extended and bent to both sides in the thickness dimension so as to detour around the RFID circuit element To, resulting in an increase in the thickness of the base tape 101 as a whole as compared with the locations of the base tape 101 where no RFID circuit element To is arranged. As the bending of the respective layers to detour around the RFID circuit element To becomes larger, or as the thickness dimension of the tape as a whole decreases, wrinkles are more liable to develop in respective portions of the base tape 101. Further, in the tag label tape 109 with print, the cover film 103 and the base tape 101 become easy to come off.

In view of this, according to this embodiment, as described above, the thickness dimensions of the respective layers of the base tape 101 and the thickness dimension of the RFID circuit element To are set so that the ratio c of the sum of the thickness dimensions of the respective layers (the above-mentioned adhesive layer 101a, base film 101b, adhesive layer 101e, adhesive layer 101c, and separation sheet 101d) of the base tape 101 to the thickness dimension of the RFID circuit element To is within the range of $0.8 \leq c \leq 8.2$. In this way, by setting the above-mentioned ratio c to be 0.8 or more to make the respective layers of the base tape 101 thick relative to the RFID circuit element To, the influence of the sandwiching of the RFID circuit element at the arrangement location of the RFID circuit element To can be reduced to thereby prevent the formation of wrinkles. Further, it is possible to suppress the cover film 103 and the base tape 101 from separating from each other.

On the other hand, the base tape 101 is often wound into a roll at the time of its manufacture. Further, when using the base tape 101, in the tag-label producing device 1, the base tape 101 is paid out from the first roll 102 and fed while having its feed path deflected. Accordingly, when the overall thickness of the tape becomes too large, the rigidity becomes so high that it is difficult to perform the above-mentioned operations such as the winding of the base tape 101 into a roll, deflection of the feed path, and the like. In this embodiment, by setting the ratio c to 8.2 or less as described above, an excessive increase in rigidity due to the above-mentioned increase in thickness dimension is prevented, thereby making it possible to smoothly perform the winding and feeding of the base tape. Further, it is possible to avoid a situation where, due to the increase in the thickness dimension of the base tape 101A, the difference between the inner and outer circumferences of the tape at the time of winding the base tape 101A into the first roll 102 increases to cause wrinkles. Further, since an excessive increase in the thickness of the base tape 101A is prevented, an increase in the size of the first roll 102 obtained by winding the base tape 101A is suppressed, whereby the first roll 102 can be readily accommodated into the cartridge housing 7A.

In this way, the ratio c of the sum of the thickness dimensions of the respective layers of the base tape 101 to the thickness dimension of the RFID circuit element To is set to be within an appropriate range, thereby making it possible to realize a tag tape in which wrinkles do not easily form and which can be actually used in practice.

Further, in this embodiment, in particular, the tag label tape 109 with print is formed by adhering the cover film 103 on which desired print has been performed onto the front side of the base tape 101 through the adhesive layer 101a. Since the tag label tape 109 with print is formed by bonding the base tape 101 and the cover film 103 together in this way, as in this embodiment, the bonding with the cover film 103 on which printing has been performed can be performed from the bonding side (the side to be bonded onto the base tape 101). In this case, since the print surface is not exposed to the tape surface, it is possible to realize a tag label tape with print that is highly resistant to stain and moisture.

Further, in this embodiment (construction of Case 2), in particular, the base films 101b, 101f are provided on both sides in the thickness direction of the RFID circuit element To so as to sandwich the RFID circuit element To therebetween. Since the RFID circuit element To is interposed between the base film 101b and the base film 101f in this way, even when the user strips off the separation sheet 101d after forming the RFID label T, the RFID circuit element To is not directly visible due to the base film 101f.

Further, in this embodiment (construction of Case 2), in particular, the adhesive layer 101g for sandwiching the RFID circuit element To is provided. Accordingly, since the RFID circuit element To can be sandwiched from both sides in the thickness direction between the adhesive layers 101g, 101e, the RFID circuit element To can be securely and stably arranged in position within the base tape 101.

It should be noted that the present disclosure is not limited to the above-mentioned embodiment but can be modified in various ways without departing from the scope and technical idea thereof. Such modifications will be sequentially described below.

(1) When tape bonding is not performed

That is, instead of performing printing on the cover film 103, which is separate from the base tape 101 equipped with the RFID circuit element To, and bonding the cover film 103 and the base tape 101 together as described in the above-mentioned embodiment, the present disclosure is applied to a cartridge for a tag-label producing device in which printing is directly performed on the cover film equipped in the tag tape.

FIG. 26 is a plan view, corresponding to FIG. 5 described above, showing the detailed construction of a cartridge 7' according to this modification. The portions that are equivalent to those of FIG. 5 or the like are denoted by the same reference numerals, and description thereof is omitted as appropriate.

In FIG. 26, the cartridge 7' has a first roll 102' around which a thermal tape 101' is wound, and a tape feed roller 27' for feeding the thermal tape 101' toward the outside of the cartridge 7'.

In the first roll 102', the above-mentioned thermal tape 101', which is transparent and in a band shape and has a plurality of the RFID circuit elements To successively formed in the longitudinal direction thereof, is wound around a reel member 102a'. The reel member 102a' is rotatably fitted and accommodated in a boss 95 provided upright on the bottom surface of the cartridge 7'.

The thermal tape 101' wound around the first roll 102' is of a six-layer structure in this example (see the partially enlarged view in FIG. 26). The thermal tape 101' includes a cover film 101a' made of PET (polyethylene terephthalate) or the like having a thermal recording layer on its surface, an adhesive layer 101b' made of a suitable adhesive material, a colored base film 101c' made of PET (polyethylene terephthalate) or the like, an adhesive layer 101d' made of a suitable adhesive material, an adhesive layer 101e' made of a suitable adhesive material, and a separation sheet 101f', which are laminated in the stated order from the side wound on the inner side (the left side in FIG. 26) toward the side opposite thereto (the right side in FIG. 26).

The base film 101c' is adhered onto the back side (the right side in FIG. 26) of the cover film 101a' through the adhesive layer 101b'. Further, the separation sheet 101f' is adhered onto the back side of the base film 101c' through the adhesive layer 101d' and the adhesive layer 101e'. Provided between the adhesive layer 101d' and the adhesive layer 101e' is the RFID circuit element To including the loop antenna 152, which is formed in a loop coil-like configuration and performs transmission/reception of information, and the IC circuit part 151.

When the cartridge 7' is loaded onto the cartridge holder 6 and the roller holder 25 is moved from the release position to the abutting position, the thermal tape 101' is held between the print head 23 and the platen roller 26, and between the tape feed roller 27' and a sub-roller 28'. Then, the tape feed roller 27', the sub-roller 28', and the platen roller 26 are rotated in synchronization with each other, and the thermal tape 101' is paid out from the first roll 102'.

The thermal tape 101' thus paid out is supplied to the print head 23 on the downstream side in the feed direction from an opening 94 while being guided by a substantially cylindrical reel 92 rotatably fitted in a reel boss 91 provided upright on the bottom surface of the cartridge. The plurality of heater elements of the print head 23 are energized by the print-head drive circuit 120 (see FIG. 15), and the label print R is thus printed on the front surface of the cover film 101a' of the thermal tape 101' to form a tag label tape 109' with print, which is then carried to the outside of the cartridge 7' from a discharge port 96.

After the tag label tape 109' with print is carried to the outside of the cartridge 7', access (reading/writing of information) is made to the IC circuit part 151 via the loop antenna LC described above. Since the feeding by the drive roller 51, the cutting by the cutting mechanism 15, and the like thereafter may simply be performed in the same manner as in the above-mentioned embodiment, description of these operations is omitted.

It should be noted that the half-cut unit 35 used is different from the one illustrated in FIG. 10 or the like corresponding to the so-called laminate type. That is, in the structure illustrated in FIG. 10 or the like, the pad 38 is located on the print head 23 side, and the half-cutter 34 is located on the platen roller 26 side. This structure is employed in order to perform half-cut from the surface on the side opposite to the separation sheet of the tape produced. However, in the case where a thermal tape is used as in this modification (the same applies to the type that will be described later in which no lamination is performed and an ink ribbon is used), the separation sheet is located on the side opposite to that in the case of the above-mentioned laminate type. Accordingly, in order to perform half-cut of the portions other than the separation sheet, the placement of the pad 38 and the half-cutter 34 is reversed. That is, the half-cutter 34 is located on the print head 23 side, and the pad 38 is located on the platen roller 26 side.

It should be noted that in this example, in order to allow the above-described cartridge kind information and the like relating to the cartridge 7' to be automatically detected on the device side, a cartridge RFID circuit element Tc, in which information relating to the cartridge 7' is previously stored, is disposed on an outer peripheral side wall surface 93 of the cartridge 7'. Further, an antenna AT for performing transmission/reception of information to/from the RFID circuit element Tc via non-contact wireless communication is provided to a side wall portion 6A of the cartridge holder 6 opposed to the above-mentioned RFID circuit element Tc.

In the basic configuration as described above, the most prominent feature of this modification resides in that the thickness dimensions of the respective layers of the base tape 101' and the thickness dimension of the RFID circuit element To are set so that the ratio c2 of the sum of the thickness dimensions of the respective layers (the above-mentioned cover film 101a', adhesive layer 101b', base film 101c', adhesive layer 101d', adhesive layer 101e', and separation sheet 101f') of the base tape 101' to the thickness dimension of the RFID circuit element To is within the range of $1.1 \leq c2 \leq 9.8$. This will be described in detail below.

In the same manner as in the above-described embodiment, the present inventors have produced various tag labels using the tag-label producing device 1' constructed as described above while varying the above-mentioned ratio c2 of the sum of the thickness dimensions of respective layers to the thickness dimension of the RFID circuit element To, and made examination with respect to the above-mentioned formation of wrinkles and rigidity. The results of this examination will be described below.

FIG. 27 is a diagram schematically illustrating the layer structure of a tag label tape 109A' with print (base tape 101A') in the case where the above-mentioned ratio c2 is set to be large (hereinafter, referred to as the "Case 5"). FIG. 27 also shows the thickness dimensions of respective layers, and the ratio c2 of the sum of the thickness dimensions of the respective layers to the thickness dimension of the RFID circuit element To.

As shown in FIG. 27, in Case 5 mentioned above, the base tape 101A' includes, as viewed from its front side (the upper side in FIG. 27), the cover film 101a', the adhesive layer 101b', the base film 101c', the adhesive layer 101d', an adhesive layer 101g' for sandwiching the RFID circuit element To in cooperation with the adhesive layer 101d', a base film 101h', the adhesive layer 101e', and the separation sheet 101f'. The RFID circuit element To is provided so as to be sandwiched between the adhesive layer 101d' and the adhesive layer 101g'.

The present inventors have produced the tag label tape 109A' with print (RFID label T) using a tag tape formed while varying the thickness dimension of each of the above-mentioned layers between the minimum value and the maximum value (unit: Am) shown in the drawing. Then, the present inventors have examined each case with respect to the formation of wrinkles and rigidity.

Here, the ratio c2 of the sum of the thickness dimensions of the respective layers to the thickness dimension of the RFID circuit element mentioned above is calculated as c2=(A+B+D+E)/C. It should be noted that at this time, A denotes the thickness dimension of the cover film 101a', B denotes the value of the sum of the thickness dimensions of the adhesive layer 101b', base film 101c', and adhesive layer 101d', D denotes the value of the sum of the thickness dimensions of the adhesive layer 101g', base film 101h', and adhesive layer 101e', E denotes the thickness dimension of the separation sheet 101f', and C denotes the thickness dimension of the RFID circuit element To. In the construction of Case 5 mentioned above, the minimum value of the above-mentioned ratio c2 is 1.4, and the maximum value thereof is 10.5.

As a result of examination with respect to Case 5 mentioned above, in the construction where the above-mentioned ratio c2 becomes the maximum value of 10.5, although no wrinkles formed under the normal state (flat extended state), since the thickness of the base tape 101A' becomes too large, the difference between the inner and outer circumferences of the tape when it is wound into the first roll 102' increases, so wrinkles became liable to occur. Further, the rigidity of the base tape 101A' (tag label tape 109A' with print) became excessively high, making it no longer possible to smoothly perform such operations as the winding the base tape 101A into a roll, the deflection of the feed path, and the like. Further, there was also a problem in that due to the excessively large thickness of the base tape 101A', it becomes no longer easy to accommodate the first roll 102', which is formed by winding the base tape 101A', into the cartridge housing 7A'. On the other hand, in the construction in which the above-mentioned ratio c2 becomes the minimum value of 1.4, no wrinkles formed under the normal state, and since the thickness of the base tape 101A' is relatively small, no wrinkles formed even upon winding the base tape 101A' into a roll. Further, since the rigidity is also small, it was possible to smoothly perform such operations as the winding of the base tape 101A' into a roll, the deflection of the feed lath, and the like.

FIG. 28 is a diagram schematically illustrating the layer structure of a tag label tape 109B' with print (base tape 101B') in the case where the above-mentioned ratio c2 is set to be relatively large (hereinafter, referred to as the "Case 6"). FIG. 28 also shows the thickness dimensions of respective layers, and the ratio c2 of the sum of the thickness dimensions of the respective layers to the thickness dimension of the RFID circuit element To.

As shown in FIG. 28, while the base tape 101B' (tag label tape 109B' with print) of Case 6 mentioned above is of the same layer structure as the base tape 101A' (tag label tape 109A' with print) of Case 5 described above, the maximum values of the thickness dimensions of the adhesive layers 101b', 101d', 101e', and 101g', and base film 101h' are set small. Otherwise, the base tape 101B' is of the same construction as the above-mentioned base tape 101A' (tag label tape 109A' with print).

As a result of examination with respect to Case 6 mentioned above, in both of the construction in which the above-mentioned ratio c2 becomes the maximum value of 9.8 and the construction in which the ratio c2 becomes the minimum value of 1.4, no wrinkles formed in the base tape 101B' (tag label tape 109B' with print) under the normal state, and further no wrinkles formed even upon winding the base tape 101B' into a roll. Further, the rigidity of the base tape 101B' (tag label tape 109B' with print) was also appropriate, so it was possible to smoothly perform such operations as the winding of the base tape 101B' into a roll, the deflection of the feed path, and the like.

FIG. 29 is a diagram schematically illustrating the layer structure of a tag label tape 109D' with print (base tape 101D') in the case where the above-mentioned ratio c2 is set to be relatively small (hereinafter, referred to as the "Case 7"). FIG. 29 also shows the thickness dimensions of respective layers, and the ratio c2 of the sum of the thickness dimensions of the respective layers to the thickness dimension of the RFID circuit element To.

As sown in FIG. 29, in Case 7 mentioned above, the base tape 101D' (tag label tape 109d' with print) includes, as viewed from its front side (the upper side in FIG. 29), the cover film 101a1, the adhesive layer 101b', the base film 101c' the adhesive layer 101d', the adhesive layer 101e', and the separation sheet 101f', with the RFID circuit element To being provided so as to be sandwiched between the adhesive layer 101d' and the adhesive layer 101e'. It should be noted that the thickness dimensions of the respective layers of the tag label tape 109D' with print in Case 7 are set in the same manner as those of the respective corresponding layers of the tag label tape 109B' with print in Case 6 described above. Further, the construction of Case 7 mentioned above corresponds to the layer structure of each of the base tape 101' (see FIG. 26) and produced tag label tape 109' with print (see FIG. 26) used in the above-described embodiment. The thickness dimensions of the respective layers of each of the base tape 101' and tag label tape 109' with print are set in the same manner as those of Case 7.

As a result of examination with respect to Case 7 mentioned above, in both of the construction in which the above-mentioned ratio c2 becomes the maximum value of 8.1 and the construction in which the ratio c2 becomes the minimum value of 1.1, no wrinkles formed in the base tape 110D' (tag label tape 109D' with print) under the normal state, and further no wrinkles formed even upon winding the base tape 101D' into a roll. Further, the rigidity of the base tape 110D' (tag label tape 109D' with print) was also appropriate, so it was possible to smoothly perform such operations as the winding of the base tape 101D' into a roll, the deflection of the feed path, and the like.

FIG. 30 is a diagram schematically illustrating the layer structure of a tag label tape 109E' with print (base tape 101E') in the case where the above-mentioned ratio c2 is set to be small (hereinafter, referred to as the "Case 8"). FIG. 30 also shows the thickness dimensions of respective layers, and the ratio c2 of the sum of the thickness dimensions of the respective layers to the thickness dimension of the RFID circuit element To.

As shown in FIG. 30, while the base tape 101E' (tag label tape 109E' with print) of Case 8 mentioned above is of the same layer structure as the base tape 101D' (tag label tape 109D' with print) of Case 7 described above, the minimum values of the thickness dimensions of the adhesive layers 101b', 101d', and 101e', and base film 101c', and the maximum value of the thickness dimension of the RFID circuit element To are set small. Otherwise, the base tape 101E' is of the same construction as the above-mentioned base tape 101D' (tag label tape 109D' with print).

As a result of examination with respect to Case 8 mentioned above, in the construction in which the above-mentioned ratio c2 becomes the maximum value of 8.1, no wrinkles formed in the base tape 101E' (tag label tape 109E' with print) under the normal state, and further no wrinkles formed when the base tape 101E' is wound into a roll. Further, the rigidity of the base tape 101E' (tag label tape 109E' with print) was also appropriate, so it was possible to smoothly perform such operations as the winding of the base tape 101E' into a roll, the deflection of the feed path, and the like. On the other hand, in the construction in which the above-mentioned ratio c2 becomes the minimum value of 0.9, the thickness dimension of the RFID circuit element To becomes too large relative to the thickness dimension of the tape, so wrinkles formed in the base tape 101E' (tag label tape 109E' with print) under the normal state.

FIG. 31 is a table summarizing the results of examination made by the present inventors with respect to Case 5 to Case 8 described in the foregoing. As shown in FIG. 31, with the construction of Case 5, favorable results were not obtained both in terms of wrinkle suppression and tape rigidity. Further, with the construction of Case 8, although appropriate rigidity was attained, favorable results were not obtained in terms of wrinkle suppression. However, with the constructions of Case 6 and Case 7, favorable results were obtained both in terms of wrinkle suppression and tape rigidity. From the foregoing, the present inventors have found that such operations as the winding of the base tape 101' into a roll, deflection of the feed path, and the like can be performed smoothly while suppressing wrinkles and without the tape rigidity becoming excessively high, if the ratio c2 of the sum of the thickness dimensions of the respective layers of the base tape 101' to the thickness dimension of the RFID circuit element To is within the range of $1.1 \leq c \leq 9.8$.

From the foregoing, in this modification configured as described above as well, the ratio c2 of the sum of the thickness dimensions of the respective layers of the base tape 101' to the thickness dimension of the RFID circuit element To is set to be within an appropriate range, thereby making it possible to realize a tag tape in which wrinkles do not easily form and which can be actually used in practice. Further, in the construction of Case 6, in particular, the RFID circuit element To is interposed between the base film 101c' and the base film 101h', so that even when the user strips off the separation sheet 101f' after forming the RFID label T, the RFID circuit element To is not directly visible due to the base film 101h'. Further, in the construction of Case 6, in particular, the adhesive layer 101g' is provided to sandwich the RFID circuit element To in cooperation with the adhesive layer 101d'. Accordingly, since the RFID circuit element To can be sandwiched from both sides in the thickness direction between the adhesive layers 101g', 101g', the RFID circuit element To can be securely and stably arranged in position within the base tape 101'.

In the structure of the above-mentioned modification, by using a thermal tape as the tag tape, printing is performed solely with the heat generated by the print head 23 without particularly using an ink ribbon or the like. However, this should not be construed restrictively. As in the above-mentioned first embodiment, printing may also be performed using an ordinary ink ribbon. The same effects as those described above can be attained in this case as well.

In the embodiment of the present disclosure described in the foregoing, using a loop antenna as the antenna LC on the device side or the antenna 152 on the RFID circuit element To side, transmission/reception of information is performed by magnetic induction (electromagnetic induction, magnetic coupling, and other such non-contact induction method performed via an electromagnetic field). However, this should not be construed restrictively. For example, transmission/reception of information may be performed by radio communication by using, as the above-mentioned two antennas, dipole antennas, patch antennas, or the like as the communication means.

Further, while the foregoing description is directed to the example in which the tag label tape 109 with print for which printing and access (reading or writing) to the RFID circuit element To have been finished is cut by the cutting mechanism 15 to thereby produce the tag label T, this should not be construed restrictively. That is, in the case where label backing sheets (so-called die-cut labels) that are divided into predetermined sizes corresponding to individual labels in advance are continuously arranged on the tape paid out from the roll, only the label backing sheets (which are each equipped with the RFID circuit element To to which access has been made, and on which corresponding printing has been made) may be peeled off from the tape after the tape is discharged from the discharge port 11 to thereby produce the tag labels T without performing cutting by the cutting mechanism 15, and the present disclosure is also applicable to a tag-label producing device of this type.

Further, while the foregoing description is directed to the example in which the first roll 102 is formed by winding the base tape 101 or the like around the reel member 102a, and in which the roll is arranged inside the cartridge 7 and the tape is paid out from the base roll 101, this should not be construed restrictively. For example, long flat or rectangular tapes or sheets (including those formed by cutting the tape wound around the roll into suitable lengths after it is paid out) may be stacked within a predetermined accommodating portion (for example, laminated flat into a tray-like shape) to form a cartridge, this cartridge being loaded onto the cartridge holder on the tag-label producing device side and transferred and fed from the above-mentioned accommodating portion to undergo printing and writing to thereby produce a tag label.

Further, other conceivable structures include one in which the above-mentioned roll is detachably mounted onto the tag-label producing device side directly, and one in which long flat or rectangular tapes or sheets are transferred by a predetermined feeder mechanism one by one from the outside of the tag-label producing device into the tag-label producing device. Further, the present disclosure is not limited to the one that can be detachably mounted to the tag-label producing device main body side such as the cartridge 7, either; the first roll 102 may be provided as an installed or integral type one that is undetachably mounted on the main body side. In this case as well, the same effects as those mentioned above can be attained.

Further, other than those already described above, the methods according to the above-mentioned embodiment and the respective modifications may be used in combination as appropriate.

In addition, although not exemplified herein, it is to be understood that the present disclosure is implemented in various modified forms without departing from the scope of the present disclosure.

What is claimed is:

1. A tag tape comprising:
   a plurality of RFID circuit elements each including an IC circuit part that stores information and an antenna connected to said IC circuit part; and
   a first tape medium and a second tape medium that are arranged so as to sandwich each of said RFID circuit elements from both sides in a thickness direction, said first tape medium and said second tape medium having their thickness dimensions set so that $1.0 \leq x/y 8.2$, where x is the sum of the thickness dimensions of said first tape medium and said second tape medium, and y is a thickness dimension of said RFID circuit element, wherein
   said first tape medium includes:
   a tape base layer of a substantially tape-like configuration for arranging said RFID circuit element thereon;
   a bonding adhesive layer that bonds said tape base layer onto a print-receiving tape; and a mounting adhesive layer that mounts said RFID circuit element to said tape base layer of said first tape medium; and said second tape medium includes:

an affixing adhesive layer that affixes the entirety of said tag tape onto a target affixing object; and a separation material layer that covers said affixing side of said affixing adhesive layer and is peeled off at the time of affixation of said tag tap to said target affixing object; and said second tape medium further includes a tape base layer arranged so as to be located between said RFID circuit element and said affixing adhesive layer of said second tape medium.

2. The tag tape according to claim 1, wherein:

said second tape medium further includes a mounting adhesive layer arranged on the side of said tape base layer of said second tape medium that faces said first tape medium thereby sandwiching said RFID circuit element in cooperation with said mounting adhesive layer of said first tape medium.

3. The tag tape comprising:

a plurality of RFID circuit elements each including an IC circuit part that stores information and an antenna connected to said IC circuit part; and a first tape medium and a second tape medium that are arranged so as to sandwich each of said RFID circuit elements from both sides in a thickness direction, said first tape medium and said second tape medium having their thickness dimensions set so that $1.4 \leq x/y 9.8$, where x is the sum of the thickness dimensions of said first tape medium and said second tape medium, and y is a thickness dimension of said RFID circuit element; wherein:

said first tape medium includes:

a tape base layer of a tape-like configuration for arranging a plurality of said RFID circuit elements thereon, said tape base layer including a print area on which desired printing has been performed; and a mounting adhesive layer that mounts said RFID circuit element to said tape base layer of said first tape medium; and said second tape medium includes:

an affixing adhesive layer that affixes the entirety of said tag tape onto a target affixing object;

a separation material layer that covers said affixing side of said affixing adhesive layer and is peeled off at the time of affixation of said tag tape to said target affixing object; and a tape base layer arranged so as to be located between said RFID circuit element and said affixing adhesive layer of said second tape medium.

4. The tag tape according to claim 3, wherein:

said second tape medium further includes a mounting adhesive layer arranged on the side of said tape base layer of said second tape medium that faces said first tape medium thereby sandwiching said RFID circuit element in cooperation with said mounting adhesive layer of said first tape medium.

5. The tag label tape with print, comprising:

a tag tape having a plurality of RFID circuit elements, and a first tape medium and a second tape medium that are arranged so as to sandwich each of said plurality of RFID circuit elements from both sides in a thickness direction, said plurality of RFID circuit elements each including an IC circuit part that stores information and an antenna connected to said IC circuit part; and a print-receiving tape that includes a print area on which desired printing has been performed, and is bonded onto said tag tape, said print-receiving tape having its thickness dimension set so that $1.4 \leq (\alpha+\beta)/\gamma \leq 9.8$, where $\alpha$ is a thickness dimension of said print-receiving tape, $\beta$ is the sum of thickness dimensions of said first tape medium and said second tape medium, and $\gamma$ is a thickness dimension of said RFID circuit element, wherein:

said first tape medium includes:

a tape base layer of a substantially tape-like configuration for arranging said RFID circuit element thereon;

a bonding adhesive layer that bonds said first tape base layer onto a print-receiving medium; and a mounting adhesive layer that mounts said RFID circuit element to said first tape base layer; and said second tape medium includes:

an affixing adhesive layer that affixes the entirety of said tag tape onto a target affixing object; and a separation material layer that covers said affixing side of said affixing adhesive layer and is peeled off at the time of affixation, wherein said second tape medium further includes a tape base layer arranged so as to be located between said RFID circuit element and said affixing adhesive layer of said second tape medium.

* * * * *